(12) United States Patent
Schwalbe et al.

(10) Patent No.: US 7,056,477 B1
(45) Date of Patent: Jun. 6, 2006

(54) MODULAR CHEMICAL PRODUCTION SYSTEM INCORPORATING A MICROREACTOR

(75) Inventors: Thomas Schwalbe, Bad Vilbel (DE); Sebastian Oberbeck, Greifenstein (DE); Klaus Golbig, Maintal-Doernigheim (DE); Michael Hohmann, Darmstadt (DE); Andreas Oberbeck, Wiesbaden (DE)

(73) Assignee: Cellular Process Chemistry, Inc., Richland, WA (US)

( * ) Notice: Subject to any disclaimer, the term of this patent is extended or adjusted under 35 U.S.C. 154(b) by 0 days.

(21) Appl. No.: 09/578,224

(22) Filed: May 24, 2000

Related U.S. Application Data

(63) Continuation-in-part of application No. 09/496,999, filed on Feb. 3, 2000, now Pat. No. 6,537,506.

(51) Int. Cl.
*B01J 19/24* (2006.01)
*B01J 19/00* (2006.01)
*B01J 8/00* (2006.01)

(52) U.S. Cl. ............... 422/129; 422/105; 422/188; 422/189; 422/198; 422/109; 422/110; 700/266; 700/268

(58) Field of Classification Search .............. 422/105, 422/108–111, 116, 129, 198, 200, 224, 188–189
See application file for complete search history.

(56) References Cited

U.S. PATENT DOCUMENTS

| | | | |
|---|---|---|---|
| 3,881,701 A | 5/1975 | Schoenman et al. | 259/4 |
| 4,222,671 A | 9/1980 | Gilmore | 366/337 |
| 4,728,502 A | 3/1988 | Hamill | 422/116 |
| 4,894,146 A | 1/1990 | Giddings | 209/12.2 |

(Continued)

FOREIGN PATENT DOCUMENTS

DE WO 00/62919 10/2000

(Continued)

OTHER PUBLICATIONS van den Berg, A. et al. 1996. "Modular Concept for Miniature Chemical Systems." *DECHEMA Monographs:* 132: pp. 109-123.

*Primary Examiner*—Hien Tran
*Assistant Examiner*—Jennifer A. Leung
(74) *Attorney, Agent, or Firm*—Ronald M. Anderson

(57) ABSTRACT

A modular chemical production system that preferably includes a microreactor for producing a product by reacting two or more reactants. Modularization enables components such as controllers, pumps, valves, microreactors, and processing modules to be added or removed from the system as required to produce a desired product. A minimum system includes a control module and a reaction module, which has a mixing volume and a reaction volume. Various pumping modules and residence time modules may also be included in the system. Modules can be changed if malfunctioning, or for producing a different product, or to change a quantity of the chemical produced. The control module preferably accesses a database in which data define parameters for a plurality of different reactions that are optimized for the production of different chemical products. The user selects the product desired and the amount of the product, provides the reactants, solvents, and heat transfer media supplies, and the control module operates the system to automatically produce the product until the desired amount is obtained. The reaction module preferably includes a microreactor, which can be replaced with a microreactor of a different configuration to produce a different product. Connections between modules are designed to enable quick connection and disconnection of modules, and fluid lines are self sealing to prevent leakage of fluids when changing modules.

25 Claims, 13 Drawing Sheets

U.S. PATENT DOCUMENTS

| | | | |
|---|---|---|---|
| 5,209,906 A | 5/1993 | Watkins et al. | 422/200 |
| 5,250,263 A | 10/1993 | Manz | 422/81 |
| 5,399,317 A | 3/1995 | Stolowitz | 422/99 |
| 5,463,564 A * | 10/1995 | Agrafiotis et al. | 700/268 |
| 5,534,328 A | 7/1996 | Ashmead et al. | 428/166 |
| 5,580,523 A | 12/1996 | Bard | 422/50 |
| 5,595,712 A | 1/1997 | Harbster et al. | 422/129 |
| 5,641,400 A | 6/1997 | Kaltenbach et al. | 210/198 |
| 5,658,537 A * | 8/1997 | Dugan | 422/191 |
| 5,690,763 A | 11/1997 | Ashmead et al. | 156/60 |
| 5,698,485 A | 12/1997 | Bruck et al. | 501/87 |
| 5,705,018 A * | 1/1998 | Hartley | 156/345.1 |
| 5,730,947 A * | 3/1998 | Chaussonnet | 422/177 |
| 5,741,466 A | 4/1998 | Bodnaras | 422/228 |
| 5,811,062 A | 9/1998 | Wegeng et al. | 422/129 |
| 5,928,880 A | 7/1999 | Wilding et al. | 435/7.21 |
| 5,939,024 A | 8/1999 | Robertson | 422/101 |
| 5,961,932 A | 10/1999 | Ghosh et al. | 422/193 |
| 5,976,472 A | 11/1999 | Chatterjee et al. | 422/130 |
| 5,993,750 A | 11/1999 | Ghosh et al. | 422/211 |
| 6,036,927 A | 3/2000 | Chatterjee et al. | 422/191 |
| 6,126,723 A | 10/2000 | Drost et al. | 96/4 |
| 6,149,882 A | 11/2000 | Guan et al. | 422/211 |
| 6,171,865 B1 | 1/2001 | Weigl et al. | 436/52 |
| 6,192,596 B1 | 2/2001 | Bennett et al. | 34/76 |
| 6,221,226 B1 | 4/2001 | Kopf-Sill | 204/602 |
| 6,264,900 B1 | 7/2001 | Schubert et al. | 422/224 |
| 6,494,614 B1 | 12/2002 | Bennett et al. | 366/36 |
| 6,656,423 B1 | 12/2003 | Joslyn | 422/1 |
| 6,701,774 B1 | 3/2004 | Srinivasan et al. | 73/23.42 |
| 6,827,095 B1 | 12/2004 | O'Connor et al. | 137/15.01 |
| 2002/0170976 A1 | 11/2002 | Bergh et al. | 236/49.1 |

FOREIGN PATENT DOCUMENTS

| | | |
|---|---|---|
| EP | 796654 A2 * | 9/1997 |
| WO | WO 98/38487 | 9/1998 |
| WO | WO 00/34728 | 6/2000 |
| WO | WO 01/68257 | 9/2001 |

* cited by examiner

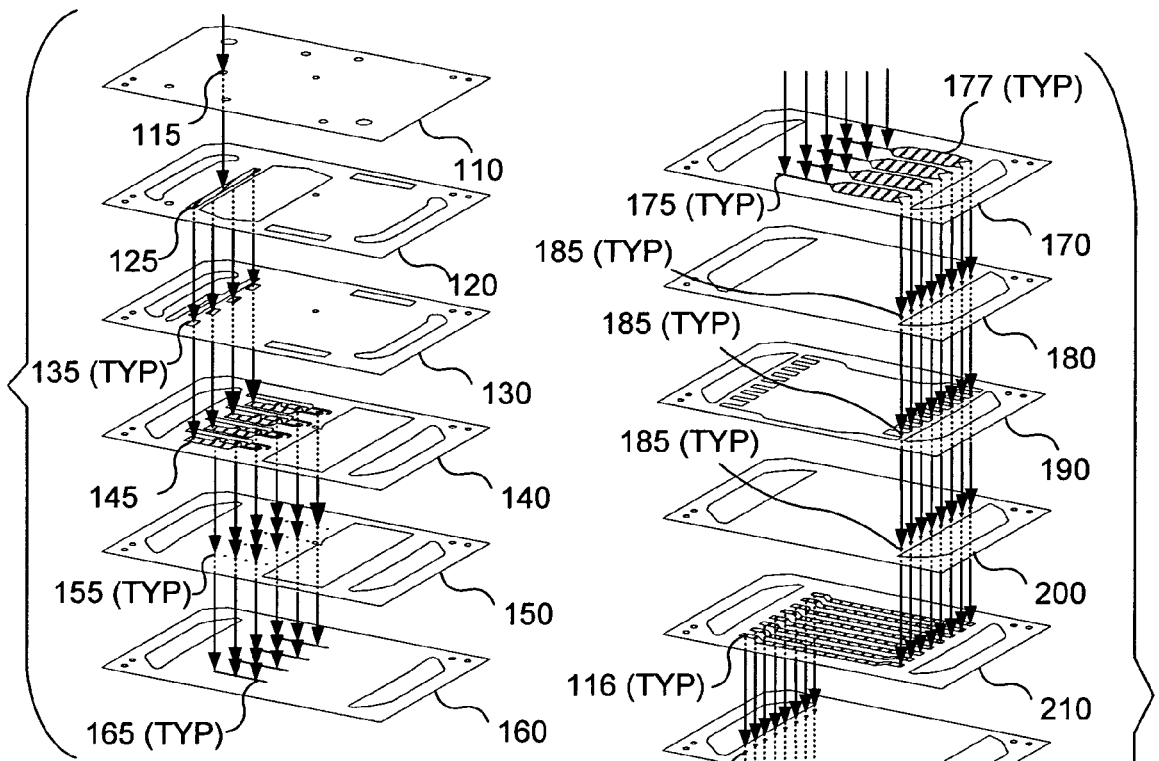
*FIG. 17A*
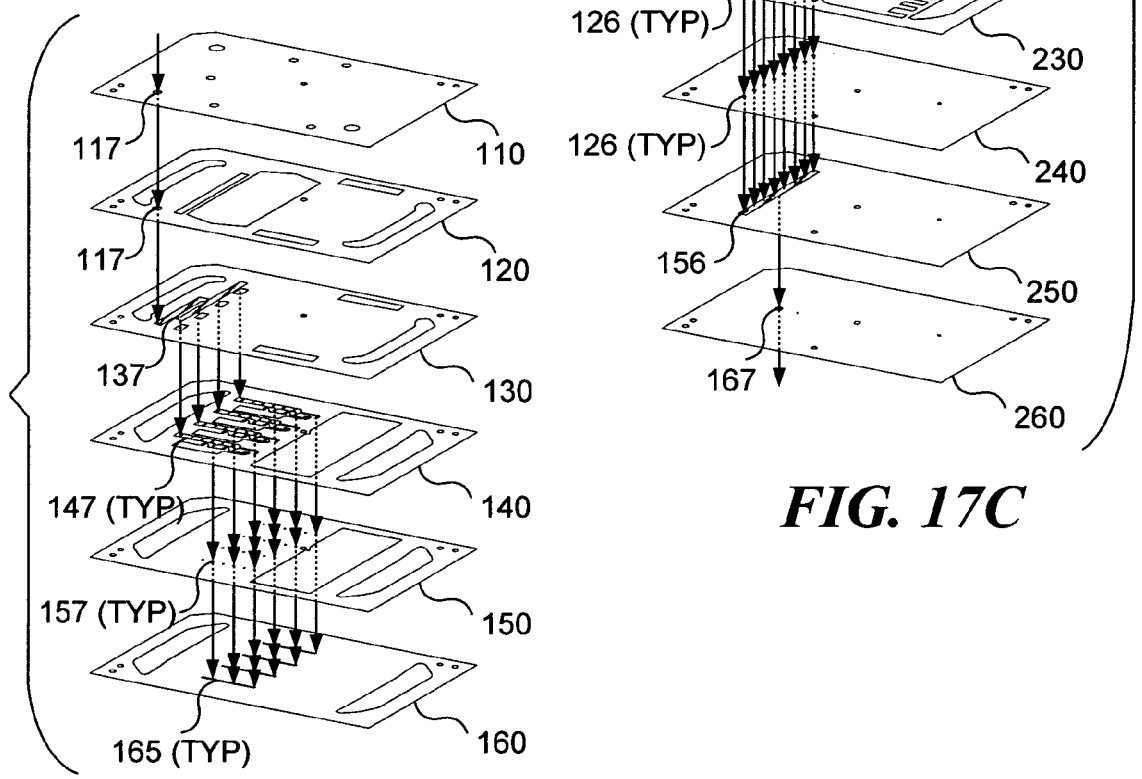
*FIG. 17B*
*FIG. 17C*

MODULAR CHEMICAL PRODUCTION SYSTEM INCORPORATING A MICROREACTOR

RELATED APPLICATIONS

This application is a continuation-in-part (CIP) of a patent application Ser. No. 09/496,999, filed on Feb. 3, 2000, which is now issued as U.S. Pat. No. 6,537,506, the benefit of the filing date of which is hereby claimed under 35 U.S.C. § 120.

FIELD OF THE INVENTION

This invention generally relates to a modular chemical production system, and more specifically, to a miniaturized modular chemical production system that incorporates a microreactor, and which enables modules to be added or removed from the system to accommodate the type and quantity of chemical produced thereby.

BACKGROUND OF THE INVENTION

Methods of controlling and optimizing the production of chemical substances are well known. The control of parameters such as temperature, pressure, mixing conditions, relative volumes of the reactants, and the use of catalysts are generally well understood. Recently, much attention has been directed to the use of micro-scale reactors for both development and production of chemical products. These types of microreactors offer several clear advantages over more conventional macro-scale chemical production systems.

First, the control of chemical processes within very small reactors is much simpler than the control of the same process in a large-scale production tank. Safety is enhanced, as relatively small volumes of chemicals are processed within a single reactor. Thus, the severity of any potential accident involving a single microreactor is minimized. Once a reaction process has been developed and optimized in a microreactor, production in larger quantities can be enabled by replicating the microreactors in sufficient quantity so as to achieve the required production levels. If such reactors can be fabricated in quantity, and for a modest cost, industrial quantities of a desired product can be manufactured with a capital expenditure equal to or even less than that of a traditional chemical production facility.

This approach also offers a substantial improvement over conventional methods for moving from small-scale production to large-scale production. In the past, a chemical production process perfected in the laboratory using small volumes of chemicals often required considerable modifications to be made in the process when converting it to large-scale production, due to changes in process conditions. Such scale-up problems often cause frustrating and expensive delays in moving from research to production.

The pharmaceutical industry in particular engages in chemical research on many new chemical compounds every year, hoping to find a drug or chemical compound with desirable and commercially valuable properties. The research process is complicated, time-consuming, and costly. Discovering a new drug has been likened to searching for the proverbial needle in a haystack. Literally tens of thousands, and sometimes hundreds of thousands, of chemical compounds must be made and tested to find one that can achieve a beneficial result without prohibitive side effects.

Such a complicated process costs vast amounts of time and money. The Food and Drug Administration (FDA) estimates that, on average, it takes eight-and-a-half years to study and test a new drug before the agency can approve it for the general public. Drug companies spend $359 million, on average, to develop a new drug, according to a 1993 report by the Congressional Office of Technology Assessment. A company such as Hoffmann-La Roche, whose annual sales in the United States alone are about $3 billion, spends about $1 billion a year on research worldwide.

It has been recognized that microreactors are of tremendous potential use to the pharmaceutical industry. Aside from providing safety benefits, and providing the ability to ease the transition from research to full-scale commercial production, microreactors utilize small volumes of chemicals efficiently. Often the chemicals used in drug research are costly and unavailable in significant quantity. Thus, the ability to perform research using small volumes of chemicals efficiently is important.

It has further been recognized that end users of microreactors, whether in a research setting or a production setting, desire not just a microreactor, but an integrated system that enables an end user to easily and effectively exploit the full potential of microreactors. Just as many computer users purchase a complete computer system, rather than just the microprocessor, which is at the heart of a computer system, many research and production facilities will desire to purchase a microreactor system that enables the end user to efficiently produce a variety of desired chemicals in almost any desired quantity, by making changes in the system, to scale the production as appropriate.

At least one design for such an integrated microreactor based system has been investigated. A patent issued to Bard (U.S. Pat. No. 5,580,523) describes a modular microreactor that includes a series of reactor modules connected in fluid communication, each reactor module having a particular function. Bard specifically teaches that the plurality of microreactor modules are mounted laterally on a support structure, and that individual microreactor modules can be replaced as needed. These reactor modules disclosed in the Bard patent minimally include a reactor module, a separator module, and an analyzer module, and additional microreactor modules can be added in series or parallel. Bard specifically teaches that separate mixing modules and reaction volume modules are used. This patent also teaches that a variety of generic components, such as computerized controls, pumps, valves, flow channels and manifolds can be included in such an apparatus.

It would be desirable to provide a modular chemical production system that utilizes microreactors but offers additional flexibility to the user, beyond that of the Bard system. For example, it would be desirable for all of the components of the system, and not just the microreactor units, to be modular in design so that any component, such as a pumping unit, can be replaced as needed to produce either a different type of chemical product, or a different quantity of the desired chemical product, or to easily replace a defective component.

Furthermore, to reduce the number of modules required, it would be desirable to provide a reaction module in which the mixing of the chemicals reacting to form the desired chemical product is achieved within the same reaction module in which the chemical reaction between these chemicals occurs, so that a separate mixing module is not required. It would also be desirable for such a single reaction module to incorporate a microreactor that enables rapid diffusion mixing. Diffusion mixing can be achieved by forcing fluids to flow in a laminar flow pattern within small fluid channels and is characterized by being extremely rapid and efficient, more so than mixing achieved by creating turbulence or agitation. It would further be desirable to provide a reaction module in which the microreactor is replaceable, so that a different type of chemical product can be produced without requiring the replacement of the entire reaction module.

Another desirable feature of the microreactor modular system is a control module that includes an intuitive user interface, enabling a user to select from a stored menu of desired chemical products, so that after selecting a desired amount of a particular product, the user is only required to connect the system to a source of the required chemicals, and the control unit will control the system according to stored processing parameters, such as flow rates, temperature, and pressure, to produce the selected product.

A pump module in such a system should provide sufficient pumping capacity so that flow rates of reactants into the reaction module can be increased to the maximum capacity of the reaction module without requiring replacement of the pump module with a higher rated output pump module. However, should additional reaction modules be necessary within a system to further increase the quantity of product produced, the pump module should be configured to be readily replaced with a pump module capable of providing the required flow rate.

It would further be desirable for all the processing modules to have housings of a consistent size and shape. Any inlet and outlet ports incorporated into the housings of the processing modules should be located in the same positions on all the processing modules, and all connections between processing modules should be of a quick connect type to enable the rapid replacement or addition of processing modules when changing the configuration of the system. Such connections should preferably be self closing to prevent spills when processing modules are replaced. The user should have an option to select processing modules adapted for either parallel fluidic heat transfer or serial fluidic heat transfer, when temperature control of a chemical process is required.

Because many possible reactions that can be beneficially achieved using such a modular chemical production system involve pressure dependent reactions, it would also be desirable for such a system to include a throttle, such as a proportional valve, at the end of the reaction path. Closing the throttle will make the pumps in the pump module apply a higher pressure to the liquids, to maintain a constant flow rate.

SUMMARY OF THE INVENTION

In accord with the present invention, a modular system is defined for producing a desired chemical product from a plurality of reactants. The reactor system includes a control module and a reaction module. Different chemical products can be produced by replacing the reaction module or reconfiguring the modular system, as appropriate.

The control module is adapted to monitor and control a production of the desired chemical product by controlling the flow of each reactant from a reactant supply source. The control module includes a memory, a processor, and a user interface. Stored in the memory are machine instructions that are executed by the processor to enable the control module to carry out its control functions. The control module also controls a reaction module that is in fluid communication with each reactant supply source and which includes a microreactor in which the desired chemical product is produced by a reaction between the reactants. The microreactor includes a mixing volume and a reaction volume. The plurality of reactants are preferably fluids, and may be in a gaseous state.

In one embodiment, the modular system includes a pump module, which is also controlled by the control module. The pump module is in fluid communication with each reactant supply source, and with the reaction module and enables and controls the flow of fluids within the modular system under the direction of the control module.

Optionally, an additional processing module can be included in fluid communication with the reaction module. In one embodiment, the additional processing module comprises a residence time module that includes a capillary passage of a selected length, the length controlling a residence time of the desired chemical product in the residence time module. Preferably, the residence time module also includes a proportional valve that is controllably connected to the control module to enable the control module to selectively vary a pressure within the modular system.

The modular system can also include additional reaction modules, each including a microreactor, and each microreactor is designed to achieve a single step in a multi-step reaction. A chemical product that can be made by carrying out two different processing steps can be produced using a modular system in accord with the present invention that incorporates two reaction modules, each reaction module including a microreactor adapted to facilitate a single step in the two step process. Each reaction module will be controllably connected to the control module. Fluid from each reactant supply source will be directed through the pump module (unless no pump modules is used, as can be the case when the reactants are gases) and into a first reaction module, in which the first step in the reaction is achieved. The second reaction module is in fluid communication with the outlet of the first reaction module, and the partially reacted fluids will flow from the first reaction module to the second reaction module, where the second step in the reaction will be achieved. If required, residence time modules can be placed between the first and second reaction modules. In a similar fashion, reactions requiring more than two steps can be achieved using a corresponding number of reaction modules. The microreactors are configured to facilitate the completion of a specific class of chemical reactions, and each microreactor can be removed from its reaction module and replaced with a different microreactor configured to facilitate the completion of a different chemical reaction, thus enabling the system to selectively complete a variety of different chemical reactions, thereby producing a wide variety of different chemical products.

Furthermore, the each microreactor is configured to enable at least one process relating to the production of a desired chemical product. Frequently microreactors will enable a plurality of reagents to be mixed together to form a desired product. It is preferred that each microreactor be able to achieve a precise temperature control of the plurality of reagents and the product within the microreactor. Each microreactor will be designed to facilitate a particular type of chemical reaction, such as a liquid/liquid reaction, a gas/liquid reaction, or a gas/gas reaction. It is envisioned that microreactors enabling additional processes relating to the chemical reaction will be useful. Such microreactors can be achieved by incorporating various types of features relating to the reaction process. In addition to enabling control of the temperature within the microreactor, such features are likely to include enabling processes such as diffusion based mixing, catalytic based processing, and/or providing and manipulating one or more of the following: a source of electromagnetic radiation, a source of sonic radiation, a source of alpha radiation, a source of beta radiation, a source of gamma radiation, a source of X-ray's, a source of radioactive particles, a source of charged particles, a source of light, an electric field, and a magnetic field. Thus, a system including a replaceable microreactor is suitable for facilitating the production of a wide variety of different chemical products. By providing a plurality of different microreactors, each of which is adapted to process a different class of reactions (such as liquid/liquid reactions), the resulting system will enable at least one process, and optionally, will enable additional processes, such as temperature control. The flexibility of such a system enables a user to selectively produce a desired product, by selecting a microreactor incorporating features appropriate for the function. While a wide variety of microreactors, each incorporating specialized features, can be fabricated, it is expected that a liquid/liquid type microreactor, incorporating only temperature control and mixing features, can be beneficially employed to produce a substantial variety of desirable chemical products.

Preferably the reaction module includes a housing with a first side that has a plurality of ports. One port enables the reaction module to be controllably connected to the control module and other ports enable it to be in fluid communication with each reactant supply. A second side of the housing includes a plurality of ports that enable the reaction module to be connected in fluid communication with the additional processing module or with a product reservoir. Also included in the housing is a mounting frame for the microreactor. The reaction module includes means for promoting the production of the desired chemical product, such as a temperature sensor, a mixing volume in which a stacked laminar flow of said plurality of reactants is enabled, and a reaction volume.

The modular system includes a plurality of fluid paths, including a fluid path for each of the plurality of reactants, a fluid path for the desired product, at least one fluid path for heat transfer media, and at least one fluid path for spent heat transfer media. The heat transfer media fluid paths can be configured in one of a parallel fluidic system and a serial fluidic system.

The pump module includes at least one pump that is controllably connected to the control module. The pump is in fluid communication with both a heat transfer media fluid supply and the reaction module. Or, the pump is in fluid communication with at least one of the plurality of reactants, and the reaction module. In one embodiment, the pump module includes an individual pump for each of the plurality of reactants, each individual pump being in fluid communication with a supply of a different one of the plurality of reactants, and with the reaction module. The pump module further preferably includes valves controllably connected to the control module, for controlling the flow of the plurality of reactants to the reaction module. In one embodiment, the pump module also includes a filter for each reactant, to remove undesired material from the plurality of reactants before the reactants flow to the reaction module.

Preferably, the pump module includes a housing having a first side that includes a plurality of ports adapted to enable the pump module to be controllably connected to the control module and to be in fluid communication with each reactant supply, and a second side that includes a plurality of ports adapted to enable the pump module to be in fluid communication with the reaction module. In addition, all connections between modules are preferably achieved using quick connect type connectors that enable rapid connection and disconnection of the modules.

Another aspect of the present invention is directed to a modular system adapted for producing a desired chemical product using only a single reactant, rather than a plurality of reactants. In such a modular system the reactor module will facilitate a single component reaction, for example, photochemically or pyrolytically. The modular system includes elements that are generally consistent with the elements of the modular system described above. Yet another aspect of the present invention is directed to a method for producing a desired chemical product with a modular system. The method includes steps that are generally consistent with the functions of the modular system described above.

Another aspect of the present invention is a microreactor for use in the modular reaction system, for reacting one chemical with at least one other chemical, for the purpose of forming a chemical product. The reactor includes a plurality of simple plates, each simple plate having at least one opening formed therein, the simple plates being stacked together to form a plurality of layers and arranges so that at least one opening in each simple plate overlaps at least one other opening in an adjacent simple plate, thereby forming at least one pathway between at least some of the layers.

Preferably, openings within different layers align so as to form at least one inlet port and at least one outlet port, for the receipt and discharge of chemicals, and to form at least one pathway for conveying chemicals to be processed. At least one pathway is formed that is in fluid connection with the inlet and outlet ports, and each simple plate has at least one opening formed in it.

A material from which the simple plates are fabricated is selected for compatibility with the chemical process. In one embodiment, the simple plates are formed from a material selected from the group consisting of crystalline wafers, ceramics, glasses, polymers, composite materials, and metals. Preferably, if formed from a metal, stainless steel is used. The material of the crystalline wafer is selected from the group consisting of silicon and germanium.

It is also preferable that the reactor accommodate a plurality of operations, including temperature control, control of chemical residence time, chemical mixing, and chemical reacting. Temperature control is achieved using a combination of one or more temperature sensors and one or more heat exchangers. Preferably, chemical mixing is carried out by employing pathways sized so that a reactant achieves a stacked laminar flow with respect to at least one other reactant.

In a reactor adapted for processing at least two reactants to form a desired chemical product, an inlet opening for each of the reactants and an outlet opening for the chemical product is provided in at least one of two outer simple plates. An intermediate simple plate is included for mixing the reactants and has at least one opening in fluid communication with each inlet opening and the outlet opening.

Generally, at least one heat transfer fluid inlet port is included in at least one of the outer simple plates, so that at least one heat transfer fluid can be introduced into the chemical reactor. Each heat exchanger is defined by an opening in a different intermediate simple plate. The opening is in fluid communication with the heat transfer fluid inlet and outlet ports and is disposed between adjacent simple plates.

Preferably, each heat exchanger is used to modify the temperature of at least one of the reactants and/or the chemical product. The heat exchangers can be used to modify a temperature of one of two reactants such that they are at different temperatures.

The thickness of the outer simple plates is about 3 millimeters, and that of the plurality of intermediate simple plates is at least about 0.2 millimeters, but not more than about 0.6 millimeters.

Preferably, when the thickness of the intermediate simple plates that are adjacent to a heat exchanger is about 0.3 millimeters. When a series of openings in the simple plates of the chemical reactor defines a fluid path for a heat transfer fluid that flow through more than one heat exchanger, the flow rate and fluid pressure of the heat transfer fluid within each such heat exchanger are substantially.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 14:
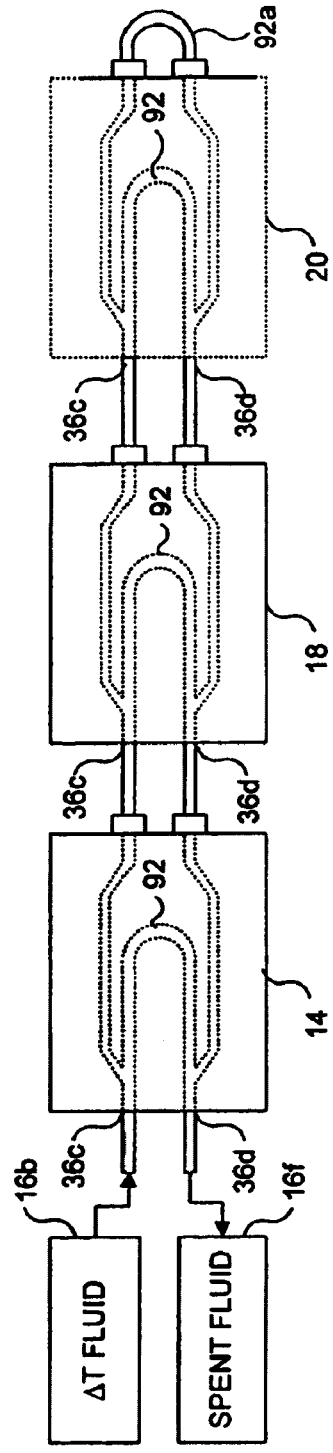
Figure 15:
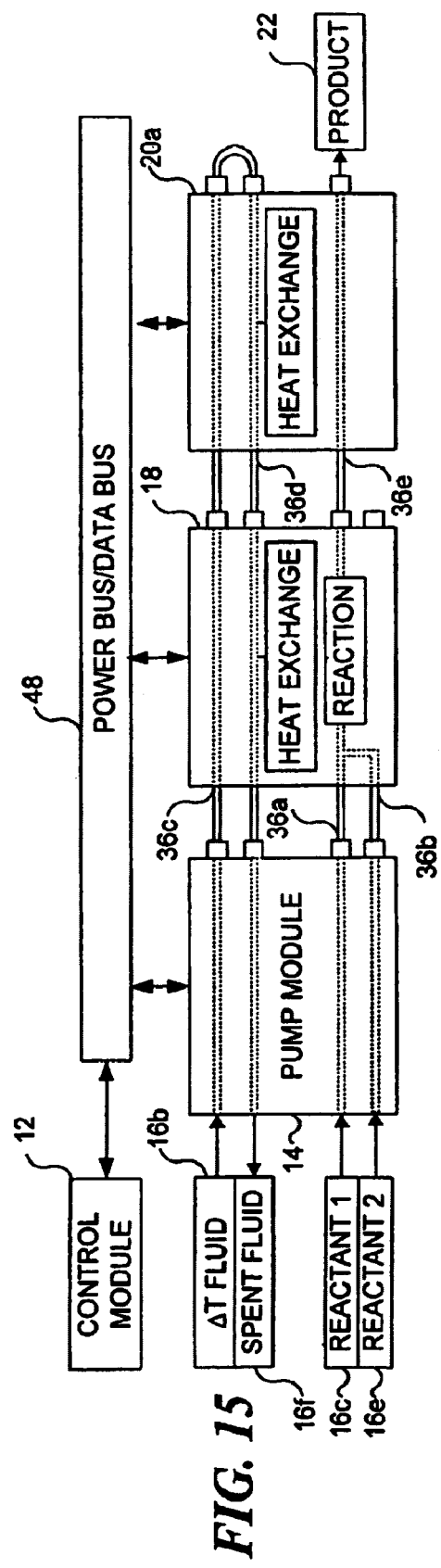
Figure 16:
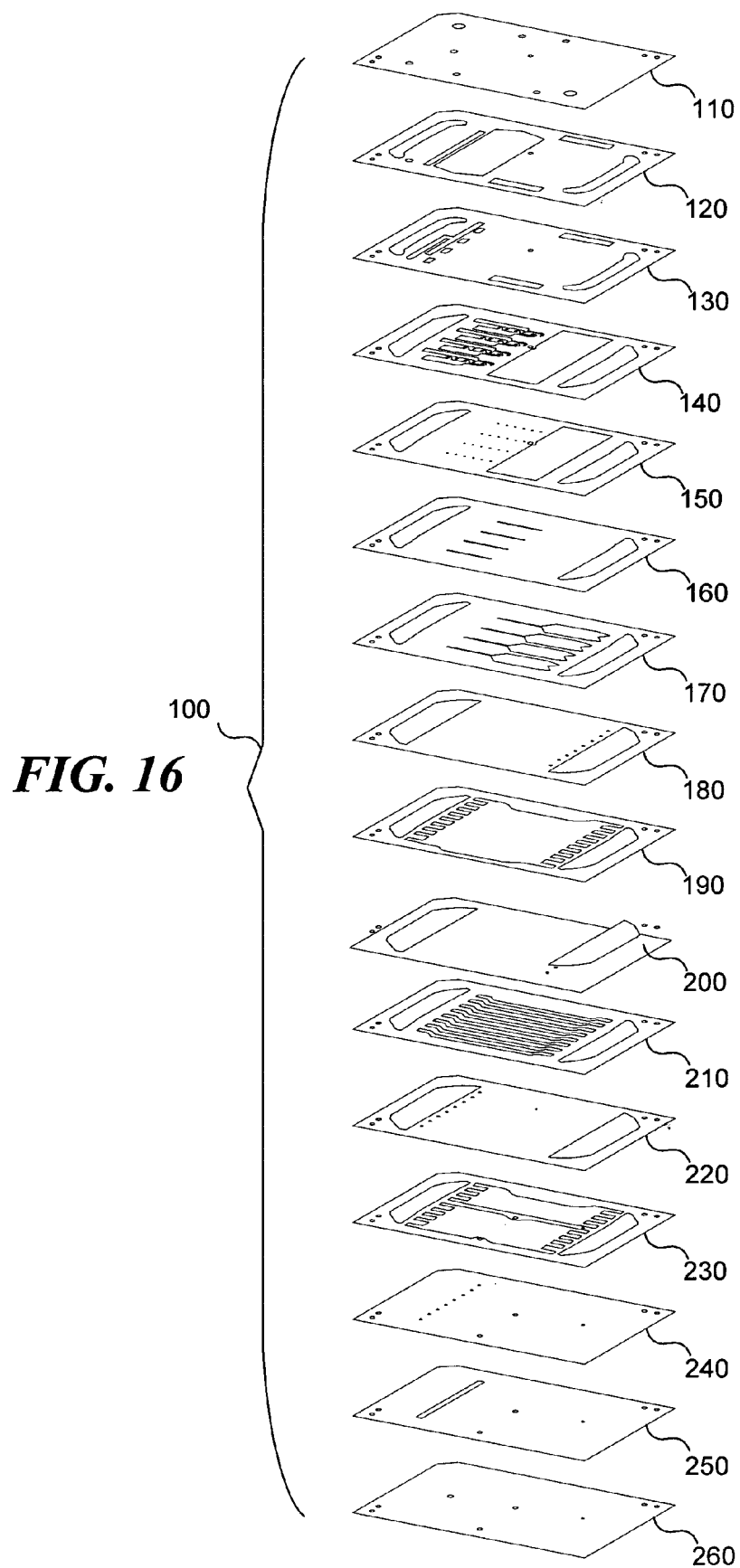
Figure 18A:
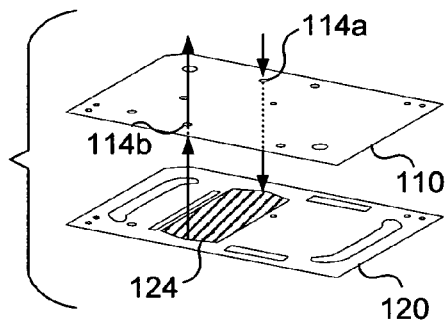
Figure 18B:
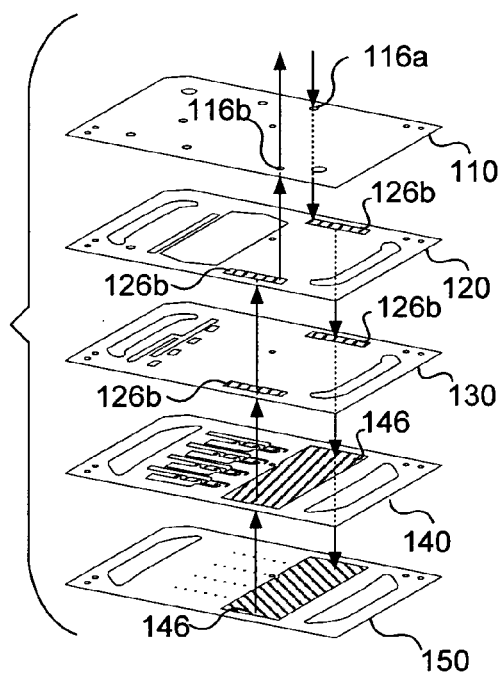
Figure 18C:
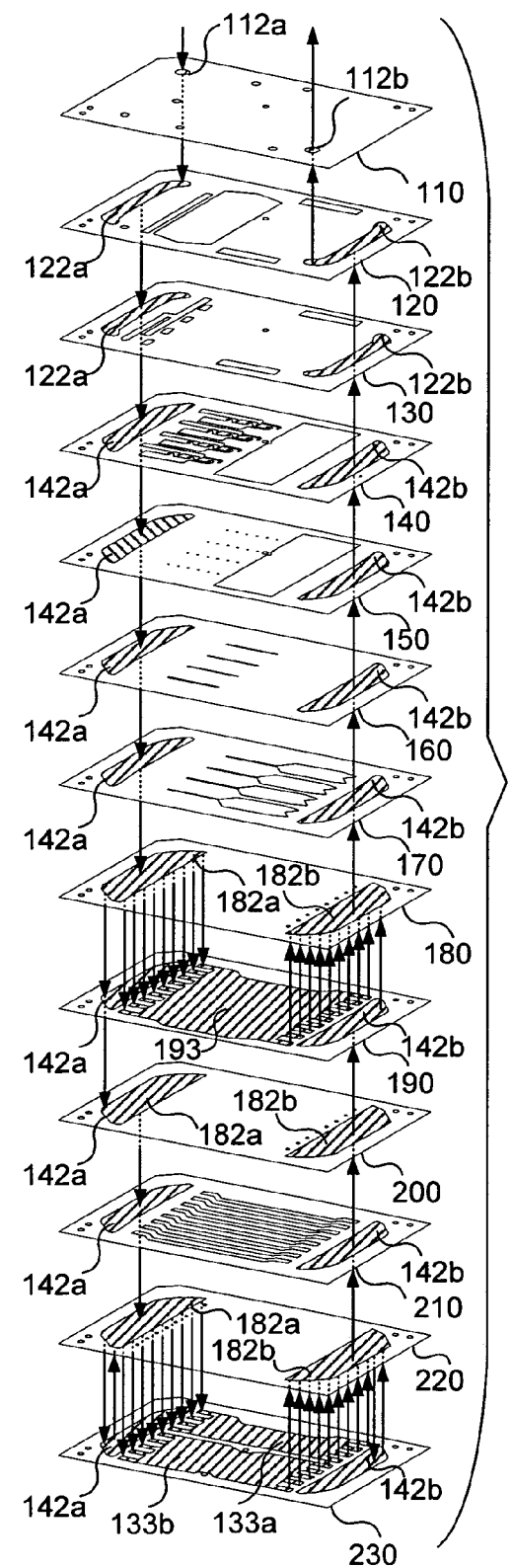

FIG. 14 is a simplified process flow diagram of a parallel heat transfer media fluidic system for use in the preferred embodiment of the present invention; and FIG. 15 is a simplified process flow diagram for a preferred embodiment of a modular microreactor system that utilizes a serial heat transfer media fluidic system in accord with the present invention; and FIG. 16 is an exploded isometric view of an exemplary reactor, illustrating how sixteen simple plates are stacked to achieve the exemplary reactor;

FIG. 17A is an exploded isometric view of the first six simple plates of the exemplary reactor, illustrating a fluid path for a first reactant;

FIG. 17B is an exploded isometric view of the first six simple plates of the exemplary reactor, illustrating a fluid path of a second reactant;

FIG. 17C is an exploded isometric view of simple plates seven through sixteen of the exemplary reactor, illustrating the combined fluid paths of the first and second reactants after they have been mixed, and then through the balance of the exemplary reactor;

FIG. 18A is an exploded isometric view of the first two simple plates of the exemplary reactor, illustrating a fluid path for heat transfer media servicing the first heat exchanger;

FIG. 18B is an exploded isometric view of the first four simple plates of the exemplary reactor, illustrating a fluid path for heat transfer media servicing the second heat exchanger; and FIG. 18C is an exploded isometric view of the first thirteen simple plates of the exemplary reactor, illustrating the fluid paths for heat transfer media servicing heat exchangers three and four.

DESCRIPTION OF THE PREFERRED EMBODIMENT

In accord with the present invention, a modular system is defined for producing a chemical product from a plurality of reactants and includes a plurality of replaceable modular units. A control module enables automated control of parameters such as concentration, flow rates, temperature, pressure, pH values, and residence time. The system is configured for continuous operation and in its simplest form, can be used in chemical research facilities for the continuous production of small volumes of specialty chemicals required for research applications. Individual modules can be replaced to modify the performance of the system, and reaction modules can be replaced with reaction modules having a different configuration to enable the completion of different classes or types of reactions. Furthermore, a single reaction module is preferably capable of facilitating a plurality of processes relating to the production of a desired product from a plurality of reagents, and the system enables a user to select from those plurality of processes which processes are appropriate to produce a desired product from a given set of reagents. Also, the reactor portion of the reaction module can be removed and replaced with a reaction module optimized for a particular class of reactions (such as liquid/liquid reactions). Reactors optimized for a particular class of reactions can be further optimized to enable different processes related to completing a reaction to be facilitated, such as diffusion based mixing, and temperature control.

It should be noted that such a system can be adapted to facilitate reactions requiring only a single reactant, rather than a plurality of reactants. Many such reactions are possible, and frequently involve reacting a single component photochemically or pyrolytically. For example, to facilitate a single component reaction of the photochemical type, the reactor portion of the reaction module will be optimized for photochemical reactions. It should therefore be understood that while the preferred embodiment described below references a modular system optimized for producing a desired product from a plurality of reactants, the scope of the invention is intended to encompass modular systems optimized to facilitate the production of a desired product by reacting only a single reactant.

Figure 1:
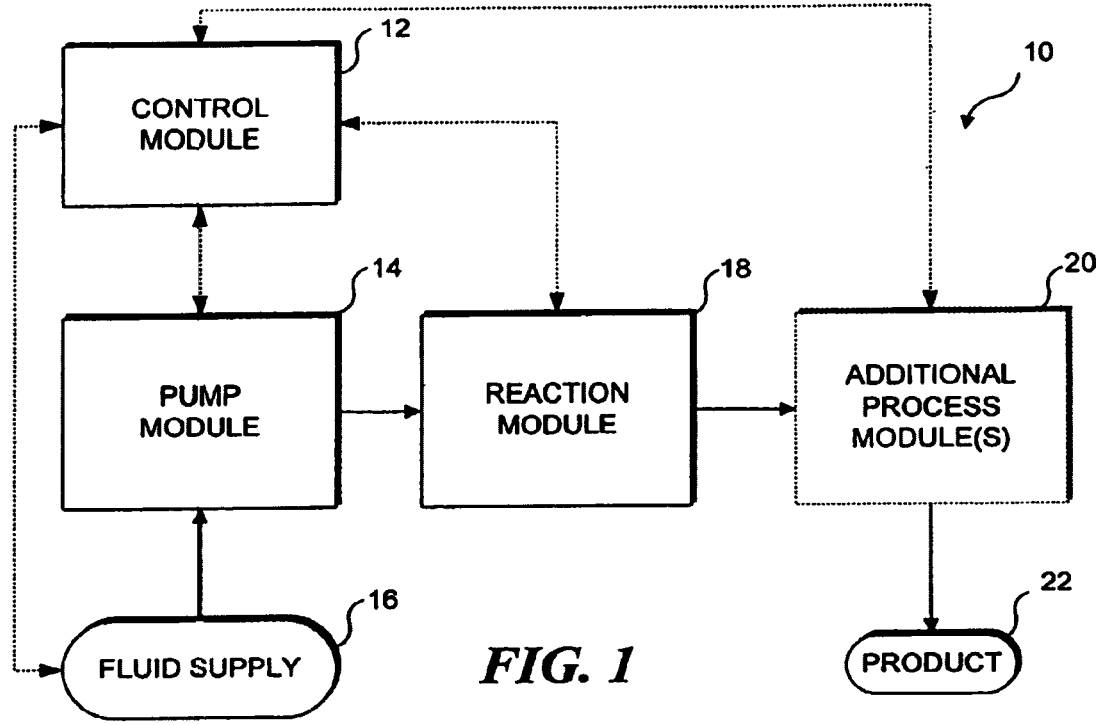
FIG. 1 is a view of a simplified process flow diagram for a modular microreactor system that includes a control module, a pump module, and a reaction module, in accord with the present invention.

FIG. 1 illustrates a simplified process diagram for a modular chemical process system 10. System 10 includes a control module 12, a pump module 14, a reaction module 18, and may optionally include one or more additional process modules 20. System 10 includes a fluid supply source 16, which supplies the system with all of the reactants required, as well as any heat transfer media that will be used in the system. It should be understood that the number of reactant fluids required varies with the type of reaction being implemented. Many chemical reactions can be achieved using two reactants, while some reactions require additional reactants. Generally, the reactants will be liquids, though gases may also be used. Solid reactants will generally be dissolved or suspended in a fluid for ease of processing in the system. It is preferred that any heat transfer media be fluidic in nature also. While solid phase heat transfer media are known in the art (such as silica), assuring a continual flow of such solid heat transfer media through small passages in heat exchangers can be difficult, and in general, fluidic heat transfer media are preferred in the present invention. Fluid supply source 16 can also include a solvent fluid used to flush the fluid passages of system 10 to remove any potential contaminants before the reactants are introduced into the system. The particular design of fluid supply source 16 is not critical. It is contemplated that standard chemical product containers and/or laboratory glassware can be beneficially employed to serve as fluid supply source 16. It is further contemplated that fluid supply source 16 will include a plurality of different fluid containers, including a separate container for each different reactant used, a container for solvent, and a container for heat transfer media.

Control module 12 is connected to control pump module 14, reaction module 18, any additional process modules 20, and fluid supply source 16. Reactants and heat transfer media flow from fluid supply source 16 to the pump module. Control module 12 controls the flow of fluids from fluid supply source 16, as well as controlling the pumping rate of pump module 14. Heat transfer media and reactants flow from pump module 14 to reaction module 18, where the desired chemical reaction takes place, and the desired product is produced. The product exits reaction module 18 and flows either to one or more additional process modules 20, or to a product collection vessel 22.

Additional process modules 20 can carry out a variety of functions. In one embodiment, the additional process module comprises a residence time chamber to provide additional time for the reagents to complete their reaction before the product they produce is collected at product recovery vessel 22. Depending on the nature of the desired product, and the chemical process used to produce that product, additional process module 20 can comprise an additional reaction module 18, for example, as would be required for a two-step reaction process in which the product of the first reaction module 20 is combined with a reagent to produce the final desired product.

Figure 2:
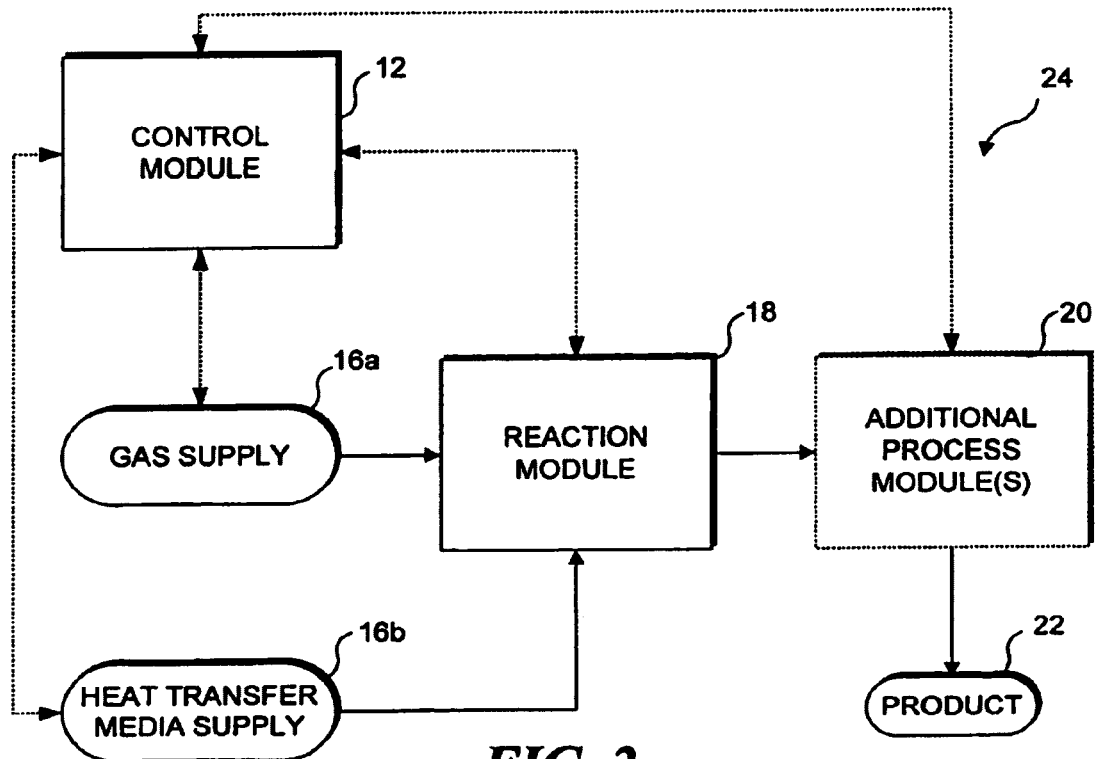
FIG. 2 is a simplified process flow diagram for a modular microreactor system that includes a control module and a reaction module.

FIG. 2 illustrates a modular chemical production system 24 that does not include a separate pump module. Such a system is possible when the reactants are gases, and the flow rates of the reactants are controllable using valves. System 24 includes a reactant gas supply 16a and a heat transfer media supply 16b. Again, most commonly, two different reactants will be used, though some reactions will require more. Those of ordinary skill in the art will readily understand how the selection of a desired product and the reaction used to obtain that product necessitates a specific set of two or more reactants be employed in the system.

Reactant gas supply 16a and heat transfer media supply 16b are connected in fluid communication with reaction module 18. Both reactant gas supply 16a and heat transfer media supply 16b are controlled by control module 12, to which they are connected, and the control module adjusts the flow rates of the reactant gases by controlling valves (not separately shown) associated with the reactant gas supply. As noted above, for modest flow rates, use of a pressurized source for reactant gas supply 16a avoids the need for a separate pump module. Standard gas bottles or commercial grade gas cylinders are expected to be useful in serving as reactant gas supply 16a.

It is envisioned that heat transfer media supply 16b will incorporate its own pump, which is controlled by control module 12, so that the flow rates of the heat transfer media can be controlled. In this case, the pump required to control the flow of the heat transfer media is simpler than that used in pump module 14. In FIG. 1, pump module 14 is employed to pump a plurality of reactants, as well as heat transfer media; thus, a more complicated pumping system is required in pump module 14 for system 10 in FIG. 1.

Figure 3:
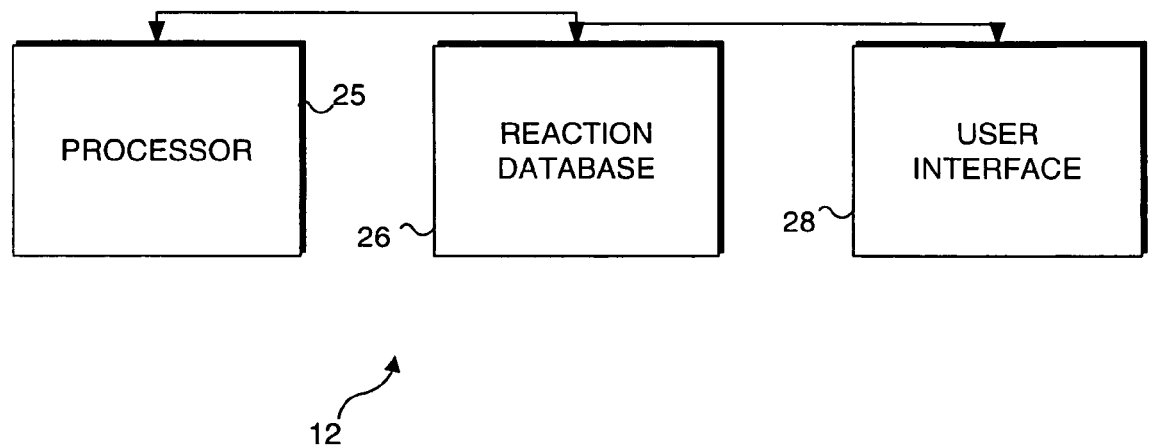
FIG. 3 is a simplified block diagram illustrating the functional elements of a control module.

As shown in FIG. 3, control module 12 includes a processor 25, an optional reaction database 26, and a user interface 28. Preferably, reaction database 26 includes detailed information relating to a plurality of different chemical products that can be produced by the modular chemical reaction system of the present invention. The detailed information preferably includes various chemical products that can be produced, the required starting materials, the relative volumes of starting materials required to produce a desired volume of each product, specified process condition parameters, such as temperature and flow rates for the reactants and any heat transfer media used, and an identification of the types of pump modules, reaction modules, and any additional process modules required to produce each product. The detailed information also preferably includes machine language instructions for execution by processor 25 that enable automatic control the system according to the stored parameters specific to each included reaction. Preferably, user interface 28 will comprise a graphic display designed such that a user can navigate from a menu that includes a plurality of options. From the display, the user can select a desired chemical product and be provided with details regarding specific types of pump modules, reaction modules (or microreactors used therein), and any additional process modules required. Once provided with this information, the user can ensure that the modular chemical production system is properly configured to produce the desired product. The user would ensure that all fluid supplies and fluid connections within the system are provided and then would activate a start command on using user interface 28, causing processor 25 to control the reaction based on the process control parameters stored within reaction database 26 for the reaction selected by the user. If optional reaction database 26 is not, used, the user would manually enter the reaction parameters using user interface 28.

Figure 4:
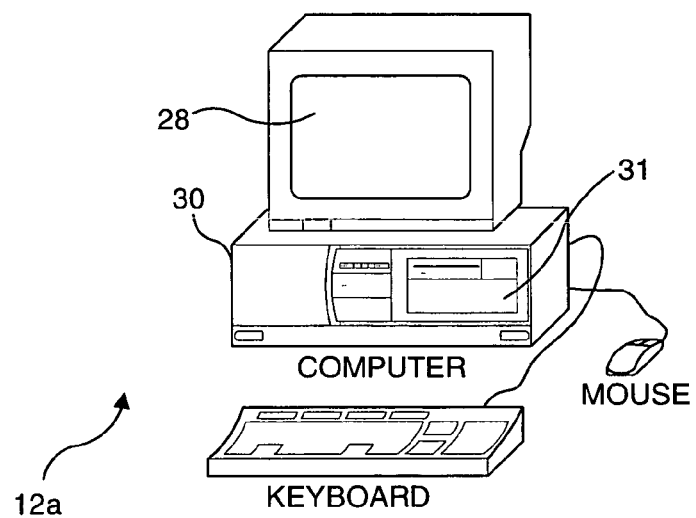
FIG. 4 is a simplified schematic diagram showing a personal computer used as a control module.

FIG. 4 illustrates an alternative preferred embodiment of a control module 12a, in which control module 12a comprises a personal computer (PC) 30. PC 30 includes processor 25, optional reaction database 26 (if so desired), which when present, is preferably stored on a hard drive 31, and the user interface (a display 28 of computer 30). When PC 30 is employed as the control module, the PC is coupled to an appropriate connector on at least one of the modules of the system through a cable connected to a data port on the PC, such as its serial port, parallel port, or universal serial bus port (none of which are shown in the Figures).

Figure 5:
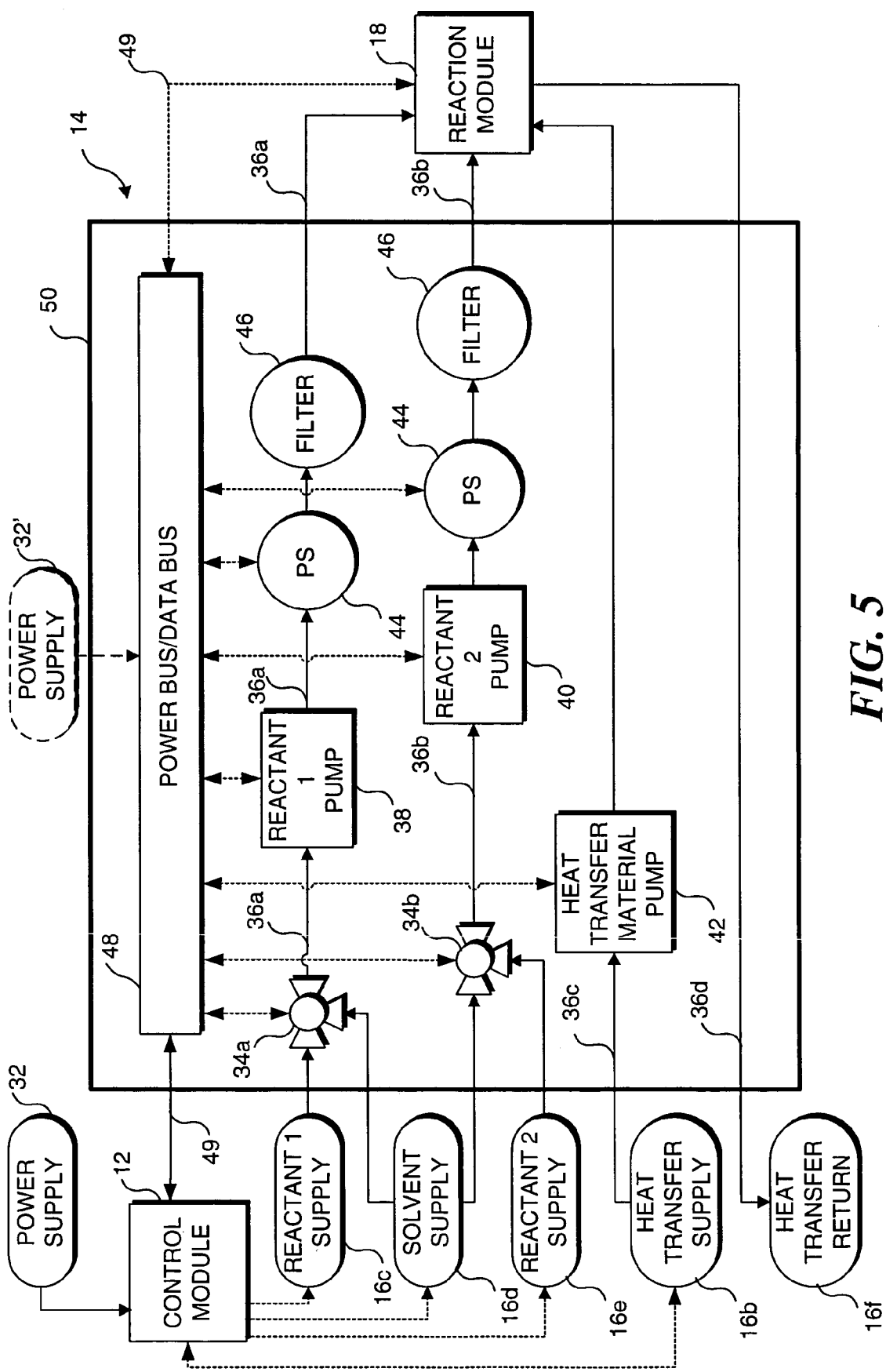
FIG. 5 is a process flow diagram illustrating functional elements of a pump module for use in an embodiment of the present invention.

FIG. 5 is a process flow diagram illustrating the components associated with pump module 14. This flow diagram for an exemplary embodiment of pump module 14 has been configured to support the processing of a two component reaction. As noted above, those of ordinary skill in the art will readily understand that pump module 14 can readily be modified to support specific chemical processes that require more than two reactants or more heat transfer fluids. A generally conventional power supply 32 provides electrical power to control module 12. Both electrical power and data are conveyed through conductors 49 that electrically and operatively couple control module 12 to pump module 14. Pump module 14 can alternatively can be coupled to a separate power supply 32' that provides its required electrical power. For systems in which the electrical demands of pump module 14 are modest, it is more convenient for pump module 14 to be energized with electrical current supplied from power supply 32 via the control module and conductors 49. When the electrical demand of pump module 14 is relatively high, it is more convenient to couple pump module 14 to separate power source 32'.

Control module 12 is operatively connected to a Reactant 1 supply 16c, a solvent supply 16d, a Reactant 2 supply 16e, and heat transfer media supply 16b. Reactant 1 and Reactant 2 will be mixed in reaction module 18 to achieve the desired chemical product. Solvent supply 16d is used to flush out all the fluid lines and passages in pump module 14 and subsequent modules to ensure that any reagent residue left over from previous reactions is flushed from the system and will not interfere in the current operation of the system in the present reaction. Furthermore, solvent supply 16d can be provided at a desired temperature, in order to pre-warm or pre-chill the fluid pathways within the modular chemical reaction system.

When the system is initialized and a particular chemical product is selected from the optional reaction database within control module 12 (or the user has entered the control parameters using user interface 28), and after the user has properly placed Reactant 1 supply 16c and Reactant 2 supply 16e in fluid connection with pump module 14, the user employs the user interface in control module 12 to activate the system. Control module 12 is operatively connected through a data/power bus 48 to all controllable elements within pump module 14. For example, control module 12 sends a control signal to a valve 34a, which is in fluid communication with Reactant 1 supply 16c and solvent supply 16d. Initially, the signal sent by control module 12 causes valve 34a to allow solvent from solvent supply 16d to flow through the system and flush out the fluid passages lines, as previously described. Control module 12 is similarly operatively connected through power/data bus 48 to a valve 34b, which is in fluid communication with solvent supply 16d and Reactant 2 supply 16e. Again, control module 12 sends a control signal through power/data bus 48 to valve 34b, enabling the solvent to flow to flush the fluid passages and lines within the system with solvent from solvent supply 16d. After a desired interval has passed, control module 12 sends a signal to both valves 34a and 34b to shut off the flow of solvent, and to change state so as to allow the desired volumes of both Reactant 1 and Reactant 2 to flow into the system. Upon passing through valve 34a, Reactant 1 flows through a fluid line 36a into a pump 38, which is also operatively connected to control module 12 via power/data bus 48. Simultaneously, the desired amount of Reactant 2 flows through a fluid line 36b to a pump 40.

Control module 12 controls the pumping rates of pumps 38 and 40 to achieve the desired flow rates of both Reactants 1 and 2. Pressure sensors 44 are included down stream of pumps 38 and 40 to provide confirmation to control module 12 that the reactants are flowing. Filters 46 are in fluid communication with fluid lines 36a and 36b and are employed to filter any particulate matter that may have contaminated Reactant 1 supply 16c or Reactant 2 supply 16e. In a preferred embodiment in which the reaction module incorporates a microreactor, these filters are particularly important. The fluid channels within the microreactor are characteristically very small in size. Thus, even relatively small particulates can clog these channels and significantly impair the efficiency of the microreactor. Preferably control module 12 is programmed to alert a user to check the filters when pressure sensors 44 indicate a change in pressure in the system, as such a pressure change may be indicative of a clogged filter. It should be noted that pressure sensors 44 and filters 46 can be disposed before pumps 38 and 40, although the preferred embodiment is as illustrated, with pressure sensors 44 disposed behind the pumps, and filters 46 disposed behind pressure sensors 44.

Control module 12 is further controllably connected to heat transfer media supply 16b. Based on the control parameters stored within reaction database 26, control module 12 will cause heat transfer media supply 16b to release the desired volume or control the flow rate of heat transfer media fluid through a fluid line 36c. Fluid line 36c is connected in fluid communication with a heat transfer media pump 42. Pump 42 is controllably connected to control module 12 to enable the flow rate of the heat transfer media fluid through the system to be controlled.

Reactant 1, Reactant 2, and the heat transfer media all exit pump module 14 and flow through fluid lines 36a, 36b, and 36c, respectively, to reaction module 18. Spent heat transfer media flowing from reaction module 18 returns to pump module 14 via a fluid line 36d. Fluid line 36d is in fluid connection with a heat transfer media return vessel 16f, and it should be noted that pump module 14 performs no operations on fluid line 36d. Fluid line 36d merely passes through the pump module to reach heat transfer media return vessel 16f. Thus, fluid line 36d could alternatively be routed to flow directly from reaction module 18 to heat transfer media return vessel 16f without flowing through pump module 14. However, the modular reaction system has been designed so that all fluids used in the process flow from one module to the next, to minimize the number of fluid lines and control lines that are external to the modules.

Figure 6:
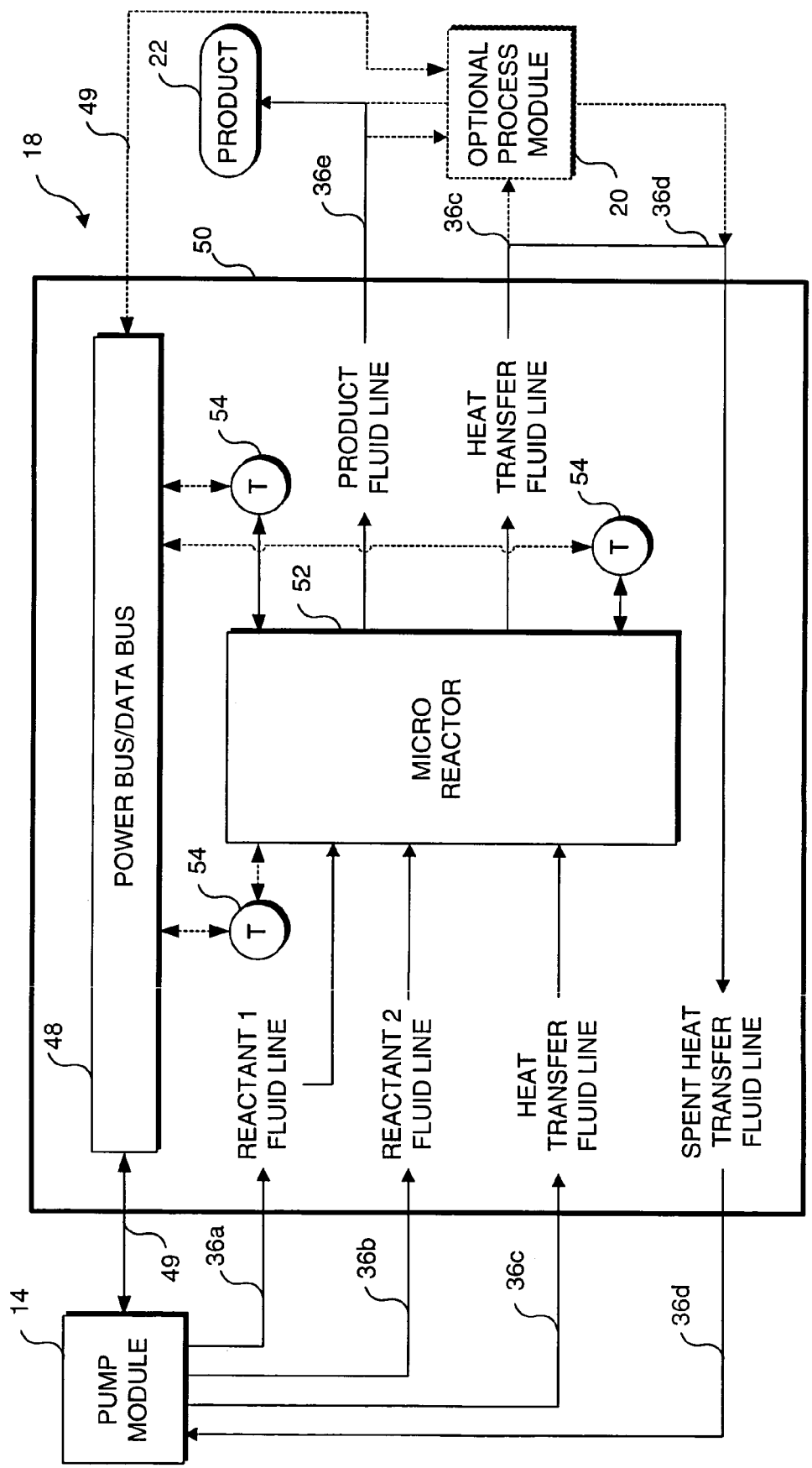
FIG. 6 is a process flow diagram illustrating functional elements of a reaction module used in an embodiment of the present invention.

FIG. 6 provides details on the functional elements included within the preferred embodiment of reaction module 18. Reaction module 18 is in both electrical and fluid communication with pump module 14 and also includes power/data bus 48. Conductors 49 connect the power/data bus in pump module 14 to power/data bus 48 in reaction module 18, enabling the bi-directional flow of data to and from control module 12 through the pump module. In addition, conductors 49 also connect the power/data bus 48 of reaction module 18 to any optional additional process module 20 that is used in the system. The fluid connections between pump module 14 and reaction module 18 include Reactant 1 fluid line 36a, Reactant 2 fluid line 36b, heat transfer fluid line 36c, and spent heat transfer fluid line 36d.

Reactant 1 flows into reaction module 18 through fluid line 36*a*, and then into a microreactor 52. Reactant 2 flows into reaction module 18 through fluid line 36*b*, and then similarly flows into microreactor 52. It should be noted that FIG. 6 does not attempt to illustrate the fluid paths of Reactants 1 and 2 within microreactor 52. The two reactants flow into the microreactor, and a single product exits the microreactor via a product fluid line 36*e*. Product line 36*e* is shown by the dash line to be in fluid communication with any optional process module. If no optional process module is required for the process carried out by the system, fluid line 36*e* flows directly to product recovery vessel 22, as indicated by the solid line in the Figure.

Heat transfer media fluid enters the microreactor via heat transfer fluid line 36*c* and then exits the microreactor, and the reaction module, through fluid line 36*c*, which is coupled in fluid communication with any optional additional process module. If no additional process modules are included, fluid line 36*c* is connected directly to spent heat transfer fluid line 36*d*, which returns the spent heat transfer fluid to spent heat transfer fluid vessel 16*f*.

Various different configurations of microreactors can be beneficially employed in the present invention. Each microreactor may be designed for only a specific chemical reaction, but will more likely be designed to support the production of a specific class or type of chemical products, since one design configuration is normally useable to produce various chemical products in which the reaction processes are similar in nature. A particularly useful microreactor is described in a commonly assigned co-pending U.S. patent application, U.S. Ser. No. 09/496,999, entitled "MINIATURIZED REACTION APPARATUS," which was filed Feb. 3, 2000, the specification and drawings of which are hereby specifically incorporated herein by reference. It should also be noted that while in one preferred embodiment, the reactor within reaction module 18 is a microreactor, a non-micro-scale reactor could alternatively be used in conjunction with the present invention. Microreactors are generally characterized as incorporating fluidic structures of less than 1 mm in size, especially with respect to reactant fluid pathways. Thus it should be understood that the present invention is not limited only to modular systems in which reaction modules must include a microreactor, as the reaction module can incorporate a reactor whose fluidic structures are larger in size than the microscale fluidic structures generally associated with microreactors. A reactor with larger scale fluidic structures can be used, as long as the overall size and shape of the reactor is adaptable to fit within the reaction module.

In addition to microreactors designed for only a specific chemical reaction, or a specific class or type of chemical reactions, it is envisioned that beneficial microreactors will incorporate the ability to facilitate a plurality of different processes related to the production of a desired product from a plurality of reagents. Generally microreactors will facilitate the mixing of a plurality of reagents. It should be noted however, that not all reactions require the mixing of reagents, such as reactions involving passing one or more reagents over a catalyst impregnated surface, or photochemical reactions that are initiated by the application of light of the appropriate wavelength. Preferable microreactors will enable the precise temperature control of the reagents and the product, so that yield and product quality can be enhanced. Other process control parameters that can be beneficially incorporated into microreactors for use in the present invention include magnetic, piezoresistive, piezoelectric, shape memory, radioactive, catalytic, optical, electromagnetic, and electrostatic control parameters. Any such control parameter is preferably capable of being controlled by control module 12. Thus in system in which the microreactor within reaction module 18 is capable of performing a plurality of processes, the selection of a specific desired chemical product by a user navigating through optional reaction database 26 will determine which of the plurality of processes supported by the microreactor will be utilized by control module 12 to produce the desired product. In systems not including optional reaction database 26, the user will manually enter known control parameters for the reaction (via user interface 28), enabling control module 12 to selectively control the required processes to achieve the desired product.

Reaction module 18 preferably includes a plurality of temperature sensors 54. These temperature sensors are electrically connected to control module 12 via power/data bus 48 in both reaction module 18 and pump module 14 and via conductors 49. Control module 12 uses data derived from the signals produced by the plurality of temperature sensors to adjust the flow rates of the heat transfer fluid (using pump 42 of pump module 14) to maintain the desired temperature parameters within microreactor 52. It should be noted that either more or fewer temperature sensors can be beneficially employed within the reaction module than the three illustrated in FIG. 6.

Figure 7:
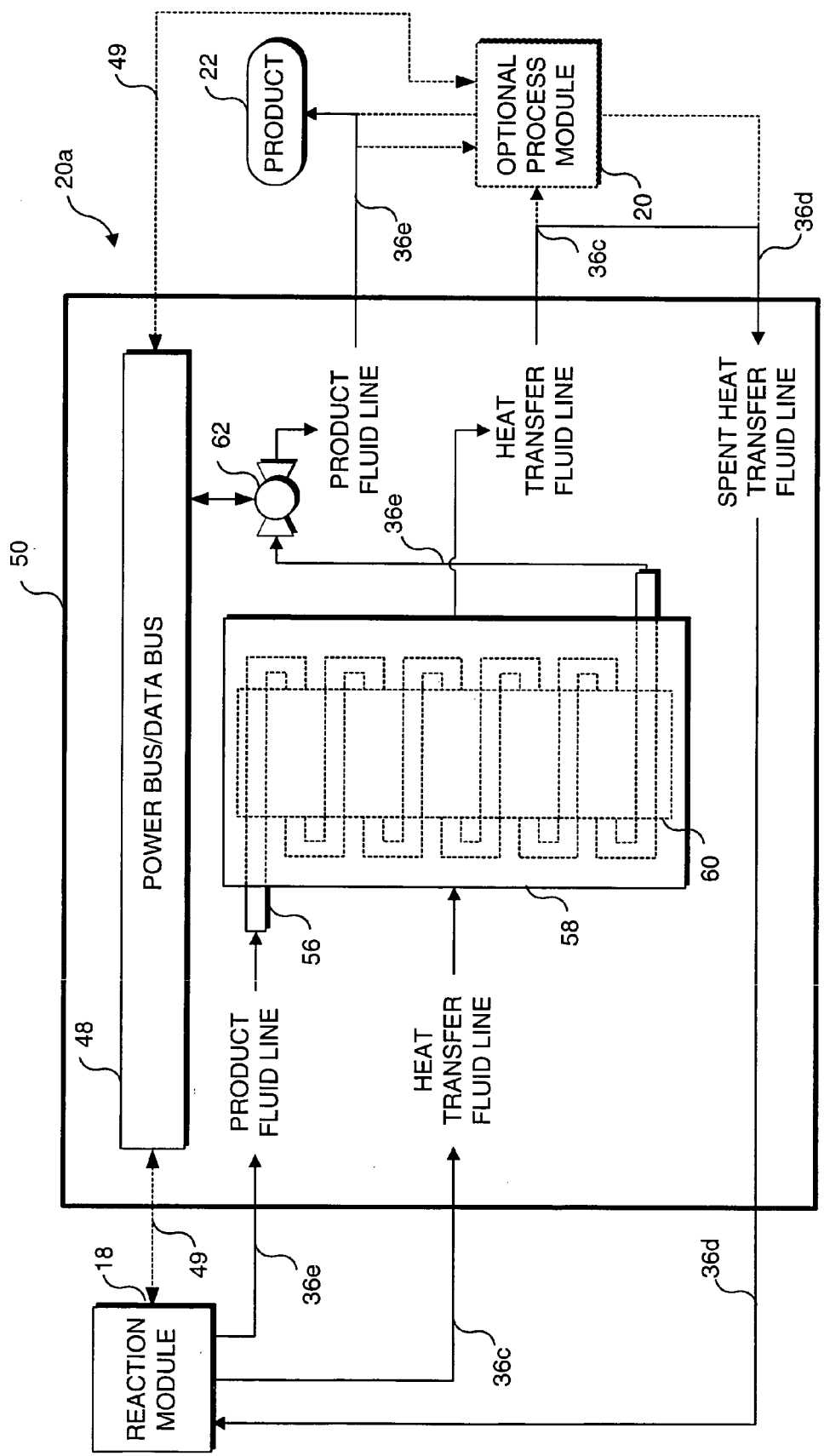
FIG. 7 is a process flow diagram illustrating functional elements of an additional process module employed in a preferred embodiment of the present invention for increasing a residence time.

FIG. 7 illustrates a preferred embodiment of an additional process module. In this embodiment, the additional process module is a residence time module 20*a*, designed to increase the residence time of the product within the system to ensure that the product is completely reacted before being sent to product recovery vessel 22. Residence time module 20*a* is in fluid communication with reaction module 18 and with any additional process module 20 disposed downstream of residence time module 20*a*. Residence time module 20*a* is electrically connected to reaction module 18, as well as any additional downstream processing modules 20, via conductors 49. As with the previously discussed pump module and reaction module, residence time module 20*a* includes power/data bus 48. As noted above, the power/data buses included in each module are all electrically connected to control module 12, and thus enable control module 12 to control components within any of the modules.

Product exiting reaction module 18 via product fluid line 36*e* enters residence time module 20*a* and is directed into a capillary passage 56. Capillary passage 56 is wound around an inner cylindrical core 60, which is covered by an outer shell 58, thereby forming a heat exchanger. Heat transfer media from reaction module 18 and fluid line 36*c* flows within the region defined by the inner core and outer shell, thus bathing capillary passage 56 in a flow of heat transfer fluid. In a preferred embodiment, capillary passage 56 is of sufficient length to achieve a 45-minute residence time at a flow rate of one milliliter per minute. Generally, a residence time of 45 minutes is sufficient for the majority of most chemical reactions to reach completion. If it is known that a particular chemical reaction can benefit from an increased residence time, an additional residence time module can be added downstream of residence time module 20*a*, or a longer capillary passage can be used in place of capillary passage 56.

The product exits capillary passage 56 via fluid line 36*e* and flows to a proportional valve 62. Several possible reactions can be performed in the system that are pressure dependent. These reactions include, for example, those involving decreasing volumes, increasing boiling points, and increasing gas concentrations in a liquid phase. Thus, specific positive effects can be achieved by causing a reaction to occur at a predefined pressure. To increase the pressure in the reaction path requires a throttle at the distal end of the reaction path. Closing the throttle makes the pumps in the pump module generate a higher pressure in the reaction module in order to maintain a constant flow rate. In this embodiment, the throttle comprises a proportional valve 62. Proportional valve 62 is electrically connected to, and thus operatively controlled by, control module 12.

Figure 8:
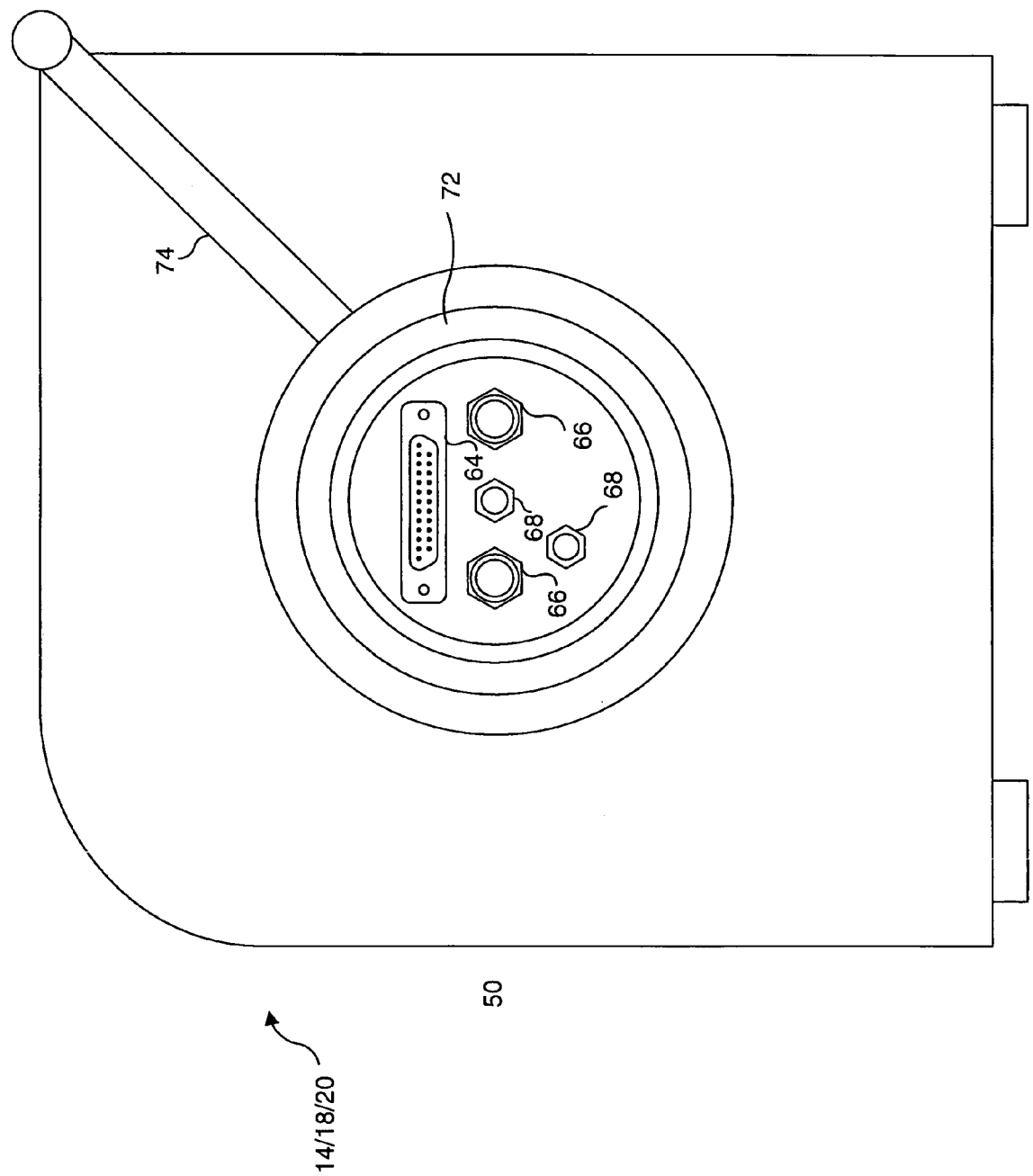
FIG. 8 is a side elevational view of a housing for use with pump modules, reaction modules, and other process modules in an embodiment of the present invention.

FIG. 8 illustrates a preferred embodiment of the housing for pump module 14, reaction module 18, and any additional process modules 20 (or 20*a*). As discussed previously in regard to FIGS. 5, 6, and 7, each of pump module 14, reaction module 18, and additional process modules 20 include fluid inlets on one side of the module and fluid outlets on an opposing side of the module. Preferably, these inlets and outlets are consistently located at the same point along the sides of each module regardless of the function of the module. Thus, a user knows exactly where fluid connections are required, and modules can be interchanged with other modules because the fluid connections are always consistently located at the same point. While FIG. 8 illustrates only one side of a module, it should be understood that the opposing side of the module incorporates the same fluid ports as illustrated in FIG. 8, with male connections provided on one side and corresponding female connections on the other. These ports include a combination data/power port 64, two heat transfer media ports 66 and two reactant/product ports 68. Power/data ports 64 are used to connect conductors 49 to the internal power/data bus 48 of each individual module, thus enabling control module 12 to be operatively connected to all of the modules. One of the heat transfer media ports 66 is used to bring heat transfer media into the module, while the second heat transfer media port 66 is used to enable spent heat transfer media to exit the module, to be collected in spent heat transfer media vessel 16*f*. Preferably the fluidic connections are of the self-sealing, quick connect type.

It should be noted that with respect to the outlet side of reaction module 18, and both the inlet and outlet sides of any additional process modules 20 (or 20*a*), that two reactant/product fluid ports 68 are not required, as only product passes through those sides of the modules. However, both reactant/product fluid ports 68 are included to maintain consistency relative to the configuration of these ports in all modules. With respect to pump module 14, both reactant fluid ports 68 are required so that Reactant 1 and Reactant 2 can be pumped from the pump module to the reaction module. On the inlet input side of reaction module 18, two reactant/product fluid ports 68 are required so that Reactant 1 and Reactant 2 can be directed to microreactor 52. Because Reactant 1 and Reactant 2 are mixed within microreactor 52, only a single one of the two reactant/product fluid ports 68 on the outlet side of reaction module 18 is used. In any additional processing modules 20, only the product, and not Reactants 1 and 2, flow through these modules, thus only one of the two reactant/product fluid ports 68 is used. It is envisioned that quick connecting bayonet type female/male connectors will be used to make the fluid connections between the fluid ports of adjacent modules. A bayonet connection 72 that encompasses the fluid ports and the power/data ports is also provided to maintain the individual fluid and power/data ports coupled and to provide a further fluid tight enclosure. Bayonet connection 72 is locked to the corresponding bayonet connection of an adjacent module by actuating a bayonet actuating lever 74. The bayonet actuating lever is included on each side of the housing to lock the bayonet connections together when the respective ports on adjacent sides of the modules are coupled together.

It should be noted that certain reactions may require further heat transfer media fluid ports or further reactant fluid ports to be provided on the modules. Those of ordinary skill in the art will readily understand that the required number of ports can be provided in the same locations on the housing of the modules so that all of the fluid connections are grouped in a single area and are consistently located and readily identified.

Figure 9:
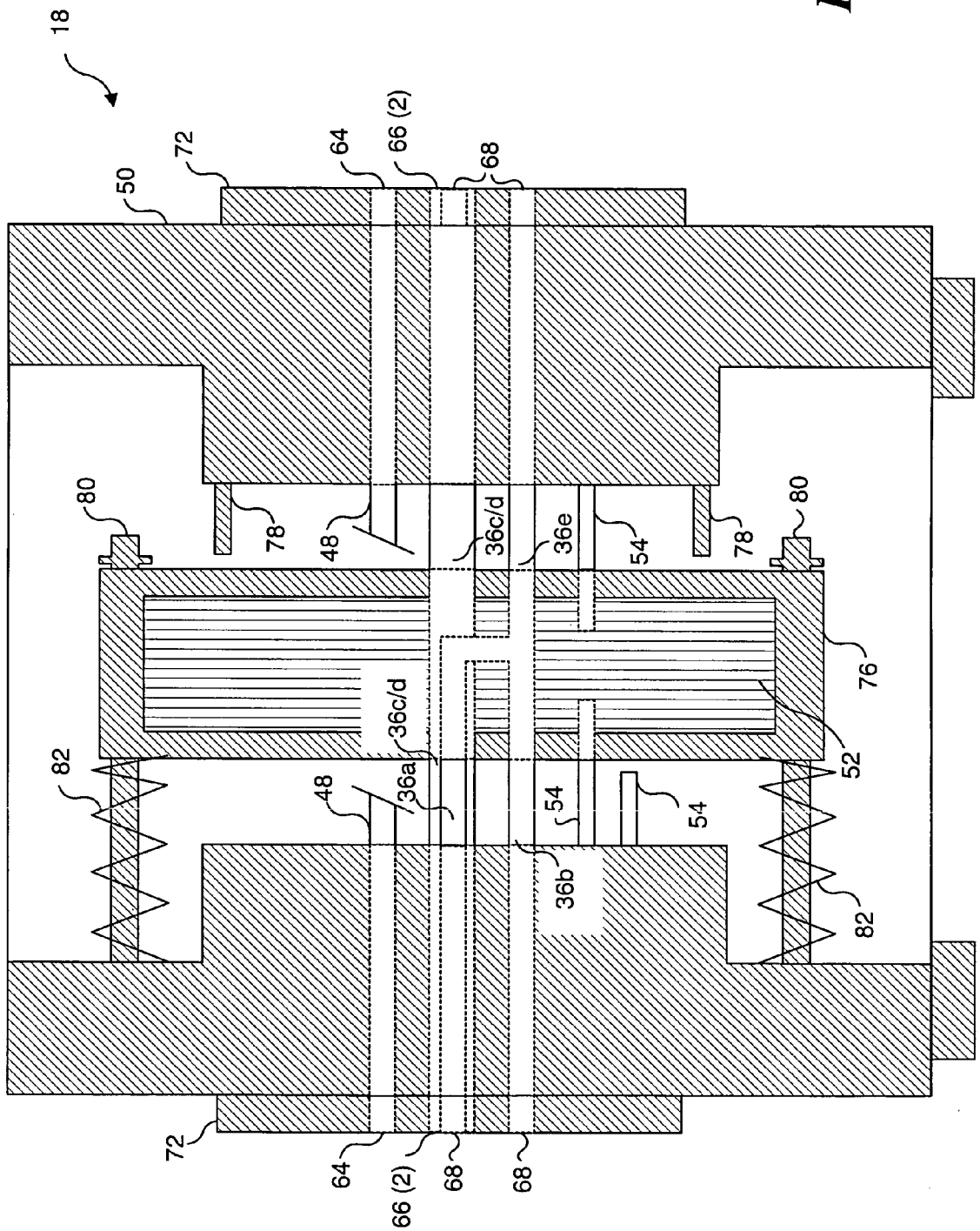
FIG. 9 is a side elevational view of an interior of the reaction module of FIG. 6.

FIG. 9 is a side elevational view that provides interior details of a preferred embodiment for reaction module 18. From this view, it can be seen housing 50 includes two bayonet connections 72 on opposite sides, each of which includes a power/data port 64, two heat transfer fluid ports 66, and two reactant/product ports 68. Within the interior of reaction module 18, microreactor 52 is disposed in a mounting bracket 76. Mounting bracket 76 is secured by a plurality of mounting bolts 80. A corresponding plurality of springs 82 are inserted over the plurality of mounting bolts and provide a biasing force that is used to secure microreactor 52 and mounting bracket 76 in a desired position. Guide pins 78 are preferably included to help properly position the reactor within reaction module 18. Reaction module 18 is designed such that microreactor 52 can readily be removed from the reaction module and replaced with a different microreactor designed to carryout a different chemical reaction or with the same design of microreactor, if the previous microreactor was found to be defective. As noted above, a reactor of the proper size and shape that does not include microscale fluidic channels can also be beneficially employed.

As indicated in FIG. 9, power/data bus 48 does not pass through microreactor 52, but is instead routed around microreactor 52. While not shown in this view, it should be understood that power/data bus 48 is electrically connected to temperature sensors 54, as can clearly be seen in FIG. 6. Temperature sensors 54 record temperatures both within microreactor 52, and within the interior volume of reaction module 18. The purpose of temperature sensors 54 is to provide control module 12 with current information regarding the temperature conditions within the microreactor and reaction module. Those of ordinary skill in the art will readily understand that different locations of the temperature sensors 54 can be used as long as information is provided to control module 12 relating to the temperature conditions in the reaction module, so that control module 12 can maintain the temperature parameters at the desired levels.

FIG. 9 illustrates heat transfer fluid paths 36*c* and 36*d* being routed through microreactor 52. As will be discussed later in regard to FIGS. 13 and 14, the fluidic system for the heat transfer can be arranged in either a serial or a parallel fashion. Heat transfer media fluid line 36*c* must pass through microreactor 52 to provide heat exchange within the reactor. However, it is possible in some embodiments that spent heat transfer media fluid line 36*d* is not routed through microreactor 52, but is instead routed through housing 50 to avoid any interference with microreactor 52.

Reactant 1 fluid line 36*a* and Reactant 2 fluid line 36*b* enter the reaction module and are directed to microreactor 52. The reactant fluids flowing through these two fluid paths are mixed within the microreactor and a reaction takes place, producing the desired chemical product. That product exits microreactor 52 through a product fluid line 36*e*. It should be understood that the fluid paths for heat transfer media, reactants and the product through microreactor 52, are quite simplified as illustrated in FIG. 9. It should further be understood that the fluid paths of the heat transfer media within the microreactor are arranged so as to define at least one heat exchanger, and often, a plurality of heat exchangers, so that different portions of the microreactor can be controlled with regard to temperature. A plurality of different mixing and reaction volumes are readily provided within microreactor 52. As noted earlier, a preferred microreactor is described in detail in the commonly assigned, co-pending U.S. patent application. Yet, a wide variety of different microreactor designs are possible, and, while it is preferred that the reactor be of the microreactor type, it is possible that reactors not incorporating microscale fluidic channels could alternatively be used as well.

Figure 10:
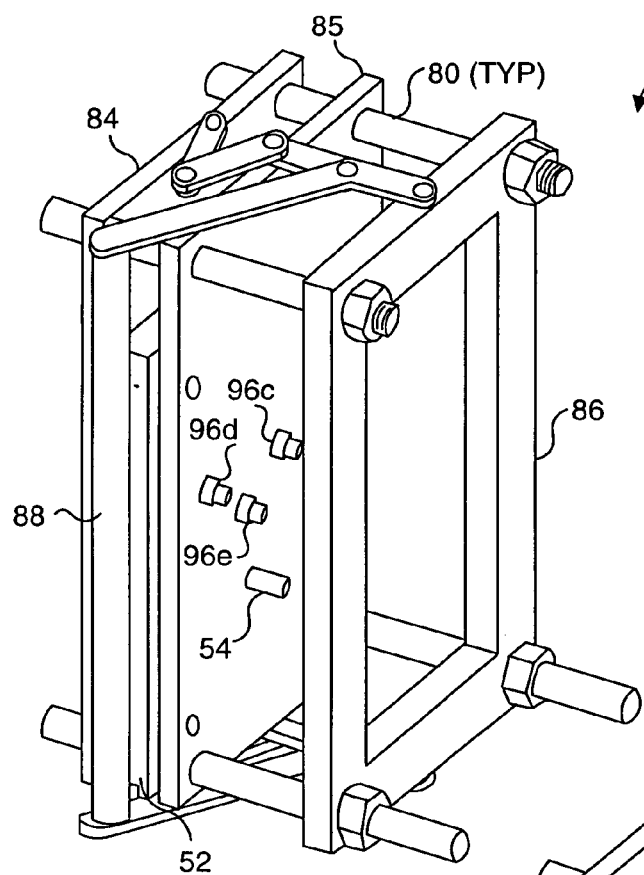
FIG. 10 is an isometric view of the reactor bracket in the reaction module of FIG. 9, showing the microreactor secured within the bracket.
Figure 11:
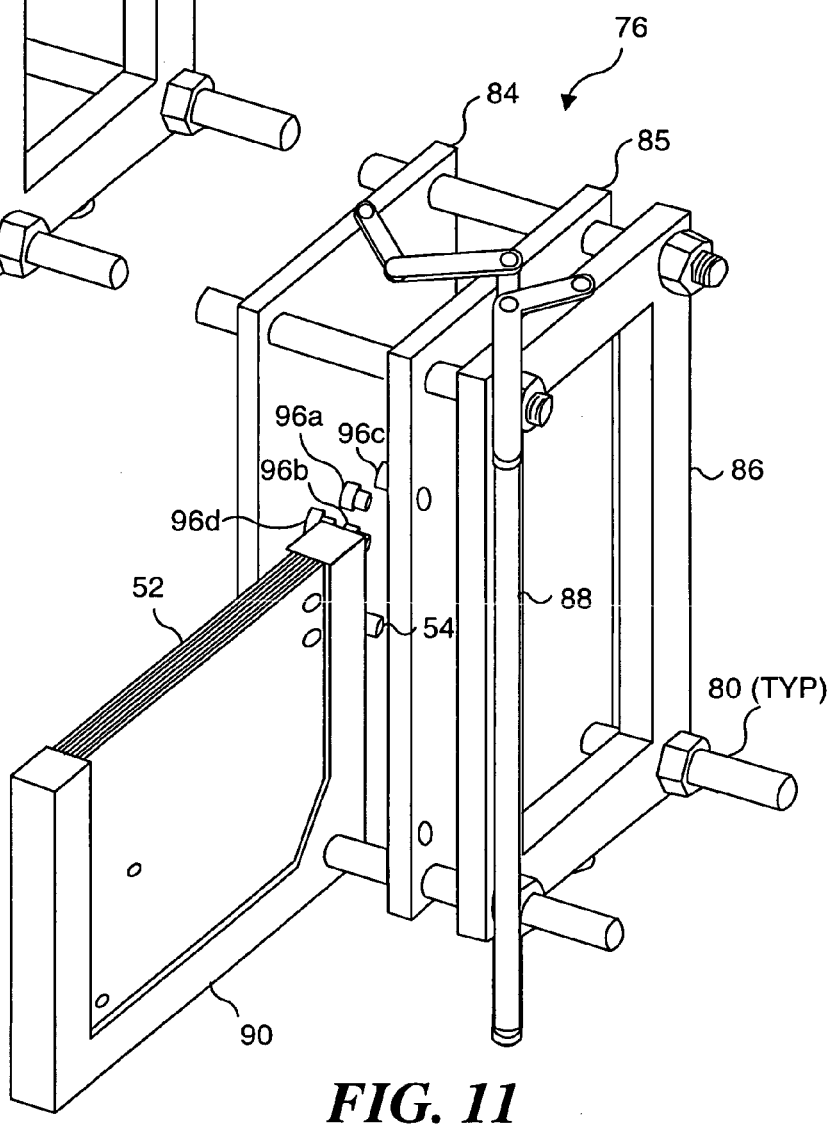
FIG. 11 is an isometric view of the reactor bracket of FIG. 10, showing the microreactor positioned to be removed from the bracket.

FIGS. 10 and 11 provide details of one preferred embodiment of mounting bracket 76. The mounting bracket in these Figures includes a plate 84, a plate 85, and a plate 86. The microreactor is sandwiched between plates 84 and 85. The positions of plates 84 and 86 are fixed, while plate 85 is movable relative to the other two plates. In a closed position, plate 85 is adjacent to the outlet side of microreactor 52. Plate 82 includes temperature sensor 54, a port 96*c* and a port 96*d*, both for heat transfer media fluid, and a port 96*e* for removing product from the microreactor. Mounting bracket 76 also includes a release lever 88, which is used to move and lock plate 85 against the microreactor to secure the microreactor between plates 84 and 85. In FIG. 10, a release lever 88 is in the closed and locked position, and plate 85 is firmly abutted against microreactor 52.

In FIG. 11, release lever 88 is in its open or unlocked position, and plate 85 has been moved away from the microreactor, enabling a reactor frame 90 to be rotated outwardly away from plates 84 and 85 through an angle of 90 degrees. Microreactor 52 can now be readily inserted into or removed from reactor frame 90. In this Figure, a plurality of fluid ports can be seen in plate 85, including fluid ports 96*c* and 96*d*, which are provided for the heat transfer media, and a Reactant 1 fluid port 96*a* and a Reactant 2 fluid port 96*b*.

Figure 12:
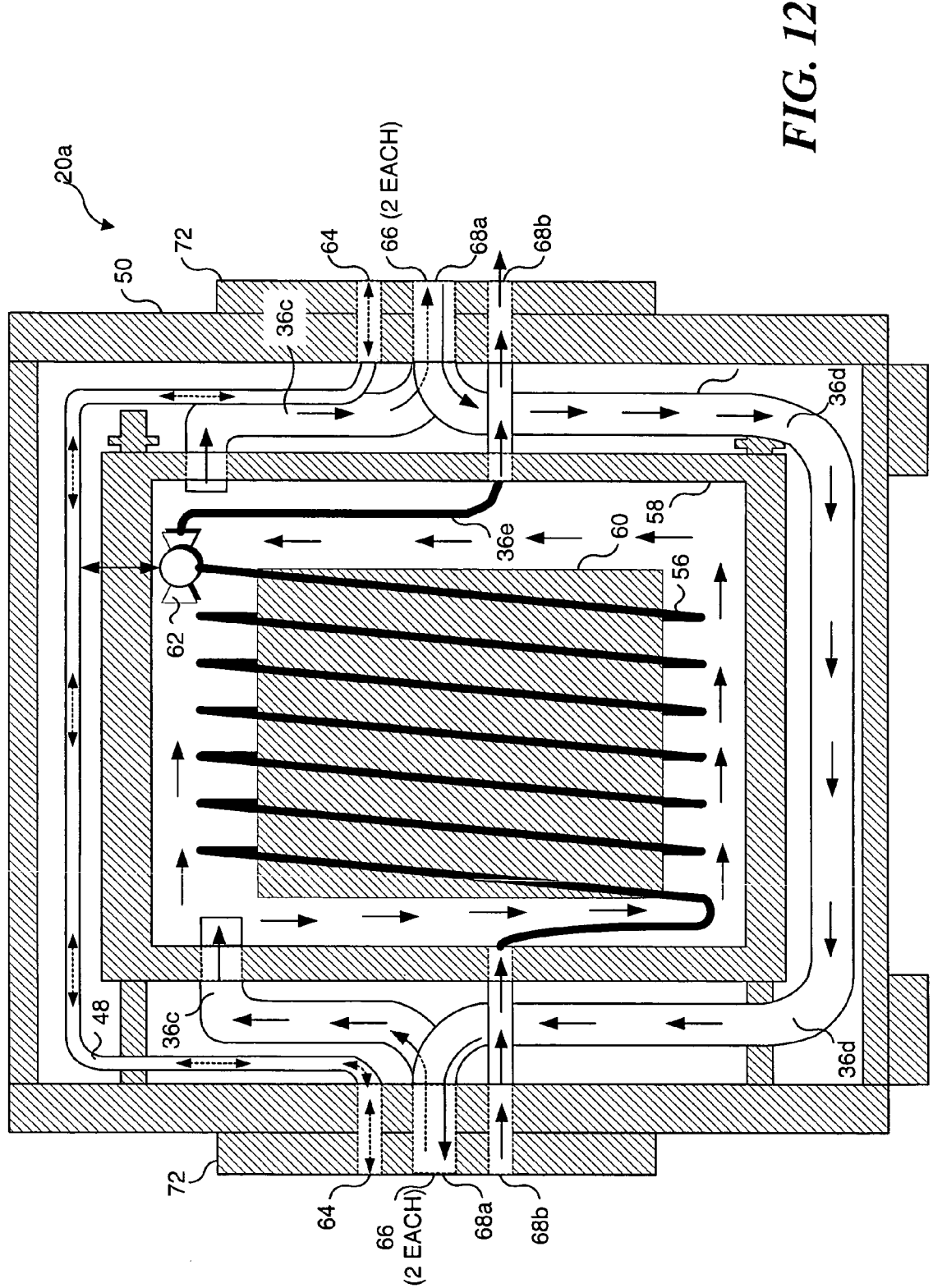
FIG. 12 is a side elevational view of an interior of the residence time process module of FIG. 7.

FIG. 12 shows further details of the interior of one preferred embodiment of residence time module 20*a*. Again, this module includes bayonet connections 72 at opposite sides, each including one power/data port 64, two heat transfer media ports 66, and two reactant/product ports 68. Within housing 50 of residence time module 20*a* are inner cylindrical core 60, capillary passage 56 (which is wound around inner cylindrical core 60), and outer shell 58. Product from reaction module 18 enters residence time module 28 via one of two fluid ports 68*b*. It is not critical which fluid port 68*b* is selected, so long as the fluid port 68*b* that is selected is properly mated to that fluid port 68*b* which is used to remove the product from reaction module 18.

Product from reaction module 18 is directed to capillary passage 56. The length of capillary passage 56 is preferably selected to provide a desired residence time. As noted above, the length of capillary passage 56 in the exemplary preferred embodiment enables a residence time of approximately 45 minutes, which is generally sufficient time for a product to be thoroughly reacted before being transferred to collection vessel 22. Heat transfer media enters residence time module 20*a* from one of heat transfer fluid ports 66 and flows through fluid line 36*c* into the region between inner cylindrical core 60 and outer shell 58. The physical arrangement of the inner cylindrical core, the outer shell, and capillary passage 56 provides a heat exchanger, which maintains the product at the desired temperature. The heat transfer media exits the region between the inner cylindrical core and the outer shell via fluid line 36*c*, which leads to one of the heat transfer fluid ports 66 at the opposite end of module 20*a*. From there, the heat transfer fluid is directed either to an additional processing module, or to a flow reverser (generally a U-shaped tube) if the heat transfer fluid is to be returned to upstream modules. Spent heat transfer (from the flow reverser or additional process modules), enters residence time module 20*a* via heat transfer fluid port 66 (i.e., the one that is not used by heat transfer media exiting the module) and moves through the module via fluid line 36*d*. Note that fluid line 36*d* is not involved in the moderation of temperature within residence time module, and merely enables spent heat transfer fluid to move upstream of the system to preceding modules, and eventually be deposited in spent heat transfer recovery vessel 16*f*. Arrows have been used in FIG. 12 to indicate the relative flow directions of each fluid. Bi-directional arrows have been used in the Figure with power/data bus 48, indicating that electrical signals are able to move both to and from control module 12 and residence time module 20*a*.

Figure 13:
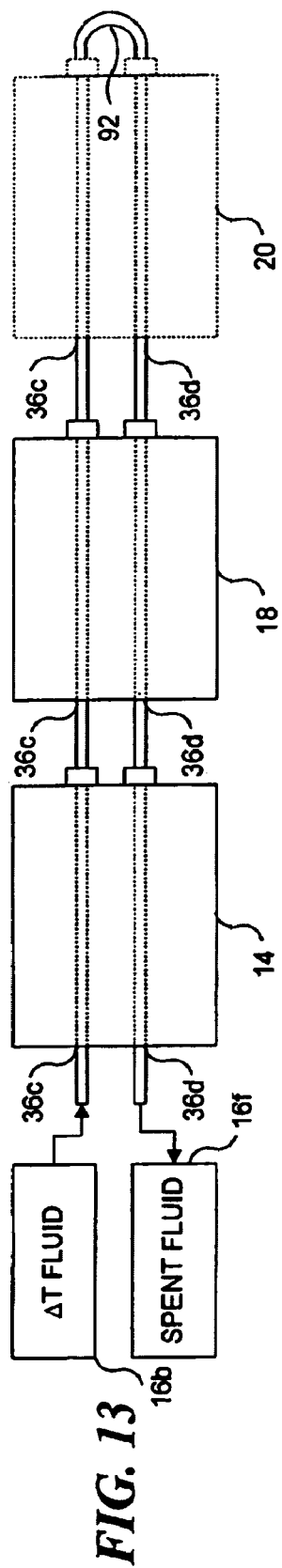
FIG. 13 is a simplified process flow diagram of a serial heat transfer media fluidic system for use in the preferred embodiment of the present invention.

As noted above, the flow of the heat transfer media fluid can be arranged in either a serial fluidic system or a parallel fluidic system. FIG. 13 illustrates a serial fluidic system. Temperature conditioned heat transfer fluid (indicated by as "ΔT Fluid") flows from heat transfer media supply 16*b* through fluid lines 36*c* to pump module 14, then to reaction module 18, and finally to any additional process modules 20. It is understood that after passing through each successive module, the temperature of the heat transfer fluid is normally changed as a result of the transfer of heat either to or from the fluid as the fluid passes through the module. After exiting additional process module 20, the temperature conditioned fluid enters a U-shaped flow reverser 92. Spent heat transfer media is then routed back through processing module 20, reaction module 18 and pump module 14 via fluid lines 36*d*, and finally collected in spent heat transfer media recovery vessel 16*f*. Other shaped flow reversers can be used, and it is also envisioned that spent heat transfer media recovery vessel 16*f* could be disposed at the end of the system, rather than at the beginning of the system, thus eliminating the need for the flow reverser and fluid lines 36*d* in processing module 20, reaction module 18, and pump module 14. An advantage of locating spent heat transfer media recovery vessel 16*f* adjacent to heat transfer media supply 16*b* is that the spent fluid can be thermally reconditioned and used to replenish the supply of heat transfer fluid, providing a closed loop system.

FIG. 14 illustrates a parallel fluidic system. In this parallel system, once the temperature conditioned heat transfer fluid has entered a heat exchanger in a module, the spent heat transfer fluid from that heat exchanger is immediately returned through flow reversers 92 and through a spent heat transfer media fluid line to the spent heat transfer fluid recovery vessel, rather than being passed to successive heat exchangers in succeeding modules. This system allows better control of temperature, especially in heat exchangers in modules farther away from the temperature conditioned heat transfer media fluid supply. It should be noted that flow reverser 92*a*, which is located in the last module of the system, is considered optional. Flow reverser 92*a* could be replaced by a fluid line (not shown) in fluid communication with spent heat transfer media recovery vessel 16*f*, or with an additional spent heat transfer media recovery vessel (not separately shown) located adjacent to additional process module 20. The use of flow reverser 92*a* provides for better fluidic equilibrium, and is therefore preferred. With respect to flow reversers 92 located within the modules, these flow reversers can be incorporated into the modules, or into components within the modules (such as within the microreactor of the reaction module, or within the heat exchanger of the residence time module defined by inner cylindrical core 60 and outer shell 58).

FIG. 15 illustrates an embodiment of the invention the includes a serial heat transfer media fluidic system, and further includes control module 12, pump module 14, reaction module 18, and residence time module 20a.

Exemplary Operational Steps Performed with the Modular System

Step 1: Preliminary Work

Prior to producing any product, a user must first select the desired product with the user interface of the control module. Furthermore, it is possible that more than one reaction is capable of producing the same product, so the user may also need to choose a preferred reaction. Optional reaction database 26 within control module 12 can be useful in selecting the desired product and method. Once the proper reaction conditions have been determined, the appropriate reactants, solvent and heat transfer media that are required must be provided.

Of course, the selection of the reactants is based upon the specific product that is desired. A solvent is selected based on its compatibility with the reagents that will be used. The solvent will be used to flush the system. The selection of the heat transfer media is determined based upon the required reaction temperature. A heat transfer media that is useful at one reaction temperature may not be useful at a significantly different reaction temperature.

Specific pump modules, reaction modules and/or additional processing modules may be required, as a function of the desired product. Because the system of the present invention is designed to facilitate the interchangeability of modules, the user must ensure that the appropriate modules are provided for a desired reaction. The pump module used will depend upon required flow rates of the reactants and heat transfer fluid, while reaction modules used will typically depend upon reactor throughput and/or the specific design of the reactor required to implement a particular reaction. Finally, many products may necessitate the use of a residence time chamber, while others will not. The desired amount of product required is also a parameter that will effect the configuration of the system, as system capacity can be modified by increasing the flow rate provided by the pump module, and by using a reactor that can accommodate that flow rate. As noted above, if the reactants are pressurized gases, a separate pump module may not be required.

Once the modules have been properly selected to achieve the desired reaction, fluidic and electrical connections between the modules are made. Sources of the reactants, the solvent, and the heat transfer media need to be connected to the pump module. Empty vessels must be supplied to receive the product and the spent heat transfer media, and placed in fluid communication with the system.

Step 2: Select "Start"

Once the system has been properly assembled and the fluid connections have been made, the user initiates the production process by executing a "Start" command with the user interface of the control module. The control module user interface also includes a "Stop" command that can be used to stop production at any time. Once started, and until stopped or a preprogrammed product volume is delivered, the control module will automatically operate the system.

Step 3: Thermal Conditioning of the System

Once the Start command has been received, the control module will begin pumping heat transfer media into the heat exchangers of the system. Heat exchangers will typically be included in the reaction module, and can also be included in any additional process modules. Preferably, the system will include sufficient temperature sensors so that the control module can determine when the desired thermal conditions have been achieved, and so that no reactants are input to the system until that time. Thermal equilibrium is considered to have been obtained in this embodiment, when the temperature sensor data indicate no more than a 2 degrees Kelvin difference separates the system temperature from the desired temperature. Alternatively, the control module can be programmed to wait a predefined amount of time before introducing reactants into the system after the start command was actuated to enable the heat transfer media to bring the system to the desired temperatures.

At the same time that thermal conditioning is occurring, the control module will use the solvent to flush the reactant fluid passages and lines of the system. Particularly when a residence time module is included within the system, the flow rate for the solvent flush may be increased significantly over the flow rate employed for the reactants, to reduce the time required for the flushing step.

Step 4: Synthesis

Once the system has reached thermal equilibrium, the solvent flush is terminated by closing the appropriate valves and the reactants are pumped to the reaction module at the proper flow rates. Reactors designed to perform different operations can be installed in the reaction module. Reactor operations typically will include thermally preconditioning the reactants prior to mixing them, and precise temperature control of the mixing area and the product produced by the reaction. In addition, reactor operations may include the use of a catalyst, or the application of various types of energy or radiation as described above. The product of the reaction then exits the reactor and moves to either an additional processing module or a collection vessel. In most reactions, any additional module employed will be a residence time module, although if the reaction requires multiple reaction steps, the additional processing module will then likely include another reaction module.

If a residence time module has been included, the product enters the residence time module where the product resides for a period of time that has been determined to be sufficient to complete the conversion of the reactants into the product. One or more heat exchangers are typically used to maintain thermal equilibrium of the product in the residence time module.

Step 5: Cleaning Cycle

Once the desired volume of product is produced (which may take a considerable length of time, as the system is designed to enable continuous synthesis of a product), the system is once again flushed with solvent. This flush can be performed manually or under the direction of the control module. If the system is continually performing the same reaction for an extended period of time, it may be beneficial to interrupt the production of product and perform a system flush as a maintenance procedure at regularly scheduled intervals.

An Exemplary Stacked Plate Microreactor

As noted above, particularly preferred embodiments of the present invention will implement a stacked plate microreactor. The following disclosure, originally provided in the commonly assigned co-pending parent application (U.S. patent application, U.S. Ser. No. 09/496,999, entitled "MINIATURIZED REACTION APPARATUS," which was filed Feb. 3, 2000), describes a reactor for reacting one chemical with at least one other chemical, for the purpose of forming a chemical product. The reactor includes a plurality of simple plates, each simple plate having at least one opening formed therein, the simple plates being stacked together to form a plurality of layers and arranges so that at least one opening in each simple plate overlaps at least one other opening in an adjacent simple plate, thereby forming at least one pathway between at least some of the layers.

Unlike prior art stacked layer chemical reactors that require relatively complicated surface features, such as grooves or channels that do not penetrate the component to be formed into each layer, the simple plates employed in the present invention require no more than an opening be formed through each plate. Machining or stamping openings into a flat plate is significantly less complicated than the silicon etching, injection molding, and ceramic molding/sintering processes described in the prior art for producing the surface features that the prior art uses to channel fluid flow. Yet the relatively simple technique of forming openings in a flat plate can be used to achieve a very useful chemical reactor, if the openings are properly placed, and the plates are properly configured and stacked so that the openings in the plates cooperate to convey fluids through the apparatus.

In the following description and the claims that follow, it will be understood that the term "simple plate" means a plate that has substantially planar opposed surfaces, e.g., a flat sheet of material. In an exemplary reactor, no openings penetrate the peripheral edges defining the perimeter of the simple plates, and fluid passages used to implement heat exchangers are not in fluid communication with fluid passages for reactants or products, or fluid passages corresponding to reaction volumes and mixing volumes. The simple plates used in the embodiments of the present invention disclosed herein are all generally rectangular and are characterized by having one or more openings that pass completely through the simple plate. Thus, the term "simple plate" as used herein and in the claims should be understood to mean a plate that does not include any etchings, grooves, or channels that do not completely penetrate the plate.

The term "groove," as used herein, should be understood to mean a surface feature that has been formed into the surface of an object that does not penetrate completely through the object, and applies to components of prior art chemical reactors.

The plurality of stacked simple plates enables a reactor to be constructed that performs from one to all of the following functions: reactant conditioning, control of reactant supply, thermal pre-treatment, combination and mixing of reactants under controlled thermal conditions, intermediate thermal treatment, post-procedural isothermal containment, post-procedural thermal treatment of reactant products, and product separation. In particular, simple plates can readily be designed and fabricated in which the dimensional characteristics of the reactant fluid passages formed by the interconnected openings of the simple plates provide for a stacked laminar flow of the reactants. Such a stacked laminar flow ensures that a particularly efficient type of mixing, referred to as diffusion mixing, can occur.

The fluidic system of the stacked simple plate reactor is preferably characterized by having a small pressure drop across the entire system. Furthermore, potential clogging problems are minimized by having few constrictions within the reactor, by introducing as few sharp directional flow changes as possible, by maintaining a small inner volume (about 1 ml), and by enabling rapid diffusion mixing in the mixing portion of the reactor. Preferably, fluidic channel geometries range from 100–500 µm, especially with respect to reactant fluid pathways (the dimensions of any heat transfer media pathways are less critical), and the walls separating the heat transfer media from the reactants or product should be of similar scale, to enable rapid heat transfer. As discussed above, several materials can be used to fabricate a stacked simple plate reactor; however, simple plates that are adjacent to openings in those simple plates comprising heat exchangers are preferably fabricated from a material that has good thermal conductivity. However, if the dimensional thickness of each plate adjacent to a heat exchanger is small, on the order of 0.3 mm, the effect of the thermal conductivity of different materials is negligible.

In general, the openings in each simple plate of a stacked simple plate reactor correspond to a fluid pathway established by stacking a plurality of simple plates, such that openings in simple plates above and below overlap, thereby allowing fluids to move throughout the reactor. Openings may also correspond to passageways for sensors, particularly temperature sensors. Preferably, to maximize heat transfer, the fluid flow directions of the heat transfer media within openings defining a heat exchanger are opposite to the direction of reactant flow.

FIG. 17 is an exploded isometric view of a preferred reactor 100 that includes the sixteen layers. Simple plates 110–260 are shown stacked in order so that the relative positions of each simple plate to each other may be examined. The preferred dimensional thickness of each simple plate is as follows:

| | |
|---|---|
| Top simple plate 110: | 3.0 mm. |
| Second simple plate 120: | 0.3 mm. |
| Third simple plate 130: | 0.3 mm. |
| Fourth simple plate 140: | 0.3 mm. |
| Fifth simple plate 150: | 0.3 mm. |
| Sixth simple plate 160: | 0.3 mm |
| Seventh simple plate 170: | 0.2 mm. |
| Eighth simple plate 180: | 0.3 mm. |
| Ninth simple plate 190: | 0.6 mm |
| Tenth simple plate 200: | 0.3 mm. |
| Eleventh simple plate 210: | 0.2 mm. |
| Twelfth simple plate 220: | 0.3 mm |
| Thirteenth simple plate 230: | 0.6 mm. |
| Fourteenth simple plate 240: | 0.3 mm. |
| Fifteenth simple plate 250: | 0.3 mm |
| Sixteenth simple plate 260: | 3.0 mm |

Simple plates 110 and 260 (the top and bottom simple plates) are thicker than other plates to provide greater structural stability. Simple plates 120–160, 200, 220, 240 and 250 are much thinner, to enhance heat transfer. As will be discussed below, a thickness of 0.3 mm provides a reasonable heat transfer ability for a wide variety of materials.

For simple plates that include solid portions used to transfer thermal energy to or from heat exchangers, a preferred thickness is about 0.3 mm. As plate thickness increases, mechanical stability increases and heat transfer ability decreases. The 0.3 mm thickness provides good heat transfer characteristics without sacrificing mechanical stability. When graphs representing mechanical stability as a function of plate thickness (50 µm–1 mm) and heat transfer ability as a function of plate thickness (50 µm–1 mm) are combined, the curves representing each functional relationship intersect at approximately 0.3 mm. It should be noted that this optimum value of 0.3 mm is independent of the actual material selected (glass, metal, plastic, etc.). While the shape of the curves defining the functional relationships change when a different material is selected, the intersection of the curves at 0.3 mm remains relatively constant. Thus, 0.3 mm represents a simple plate thickness that provides for reasonable heat transfer ability without sacrificing structural integrity.

FIG. 17A illustrates a fluid flow path of Reactant A, as it enters top simple plate 110 and proceeds through the sixth simple plate 160 of reactor 100. Reactant A enters through an inlet 115 in top simple plate 10, proceeds to second simple plate 120 of the second layer, and enters a Reactant A distributor 125. Reactant A then passes to third simple plate 130 of the third layer, passing through four Reactant A openings 135. In fourth simple plate 140 of the fourth layer, Reactant A passes through four Reactant A openings 145, which are part of an inter-digital-mixer, whose purpose is to precisely align the fluid flows for Reactants A and B to optimize mixing in later layers of the reactor. The purpose of Reactant A openings 145 is to precisely align a plurality of Reactant A fluid paths with a plurality of Reactant B fluid paths, so that a stacked laminar flow can be achieved with equilibrated pressure drops. It should be noted that a first heat exchanger 124 (see FIG. 17A) is used to bring both Reactants A and B to the proper temperature in the inter-digital-mixer of the fourth layer.

In the fifth layer, fifth simple plate 150 incorporates a plurality of reactant A openings 155 that are aligned with a plurality of Reactant B openings 157 (see FIG. 17B). These openings form an alternating pattern of 24 openings in four rows of six openings each (for a total of 12 Reactant A openings and 12 Reactant B openings). In the sixth layer, sixth simple plate 160 incorporates four fluid channels 165. It is in the four channels 165 that Reactants A and B first intermingle. Because of the pattern of fluid paths for Reactants A and B enabled by the inter-digital-mixer, Reactants A and B enter channels 165 in a stacked laminar flow pattern.

FIG. 17B illustrates the fluid path that Reactant B takes in entering the first six layers of a reactor 100. Reactant B enters top simple plate 110 through opening 117, passes through the second layer an identical Reactant B openings 117 in second simple plate 120. In the third layer, Reactant B enters Reactant B distributor 137 in third simple plate 130. In the fourth layer, Reactant B enters four Reactant B openings 147 in fourth simple plate 140. Openings 147 and 145 are collectively referred to as the inter-digital-mixer. After passing through the fourth layer, Reactant B flows into twelve openings 157 in fifth simple plate 150, of the fifth layer. Reactant B then proceeds to the four fluid channels 165 on sixth simple plate 160, where Reactants A and B are first co-mingled.

FIG. 17C illustrates the combined flows of Reactants A and B after passing through the sixth layer and proceeding through layers 7–16 of reactor 100. Reactants A and B as combined (in a stacked laminar flow pattern) flow through four fluid channels 175 on seventh simple plate 170. Channels 175 lead to four mixing chambers 177. In mixing chambers 177, the stacked laminar flow is compressed, further enhancing rapid diffusion mixing. A second heat exchanger 146 (see FIG. 18B) is used to control the temperature of the reactants as they mix in mixing chambers 177. After Reactants A and B become thoroughly mixed in mixing chambers 177, the now mixed Reactants A and B flow through a plurality of mixed reactant openings 185 on eighth simple plate 180. The mixed reactants then flow through the ninth and tenth layers via identical mixed reactant openings 185 in simple plates 190 and 200, respectively. The mixed reactants then flow into reaction channels 116 on eleventh simple plate 210. Reaction channels 116 preferably provide sufficient residence time so that the majority (if not all) of the reaction is complete. If reaction channels 116 do not provide sufficient residence time, then an additional residence time chamber can be added downstream of reactor 100. As noted above, the quality and yield of the desired reaction is greatly affected by the ability to control temperature during the reaction process. The preferred reactor provides heat exchangers on simple plates 190 and 230 to precisely control the temperature within reaction channels 116. If additional residence time chambers are required, then control of the temperature in the additional residence time chambers is also highly desirable. After passing through reaction channels 116 in the eleventh layer, the resulting product passes through a plurality of product openings 126 in simple plates 220, 230, and 240 of layers 12, 13 and 14, respectively. The eight individual product streams represented by these product openings are then combined into a single product channel 156 on fifteenth simple plate 250, of layer 15. This single product exits the reactor via a product outlet 167 on sixteenth simple plate 260, in the bottom (sixteenth) layer of the reactor.

FIGS. 18A–18C illustrate the fluid paths for heat transfer media A, B, and C throughout the preferred reactor. FIG. 18A illustrates the fluid path for heat transfer media B, which services first heat exchanger 124 in the second layer. Heat transfer media B flows into heat transfer media inlet 114a in top simple plate 110 and proceeds to heat exchanger 124 on second simple plate 120. Heat transfer media B passes through heat exchanger 124, and exits heat exchanger 124 via outlet port 114b in top simple plate 110. The purpose of heat exchanger 124 is to adjust the temperature of the solid section of portion of the third layer that is immediately above the inter-digital-mixer (openings 145 and 147) in fourth simple plate 140. In this manner, heat exchanger 124 is moderating the temperatures of Reactants A and B prior to the reactants being mixed together. It is contemplated that for the majority of reactions, it will be desirable for Reactants A and B to be of similar temperature. Those of ordinary skill in the art will readily understand, however, that there may be some reactions in which Reactant A and Reactant B will preferably be kept at separate temperatures. It is contemplated that a different stacked plate design using the same principles of the invention can be designed and fabricated to provide for a separate heat exchanger to individually modify the temperatures of Reactants A and B.

FIG. 18B illustrates the fluid path that heat transfer media C takes through layers 1–4 of the preferred reactor. Heat transfer media C enters the reactor through inlet 116a in top simple plate 110 and then proceeds through heat transfer media C intake manifolds 126a on simple plates 120 and 130, in layers 2 and 3, respectively. Heat transfer media C then enters heat exchanger 146 on fourth simple plate 140 of layer 4 and exits heat exchanger 146 by utilizing heat transfer media C exhaust manifolds 126b of simple plates 130 and 120, in layers 3 and 2, respectively. Heat transfer media C then exits the reactor using outlet port 116b of top simple plate 110. The purpose of second heat exchanger 146 is to modify the temperature of the solid portion of sixth simple plate 160 that corresponds to the mixing chambers 177 of seventh simple plate 170. Because the mixing of chemicals often spontaneously generates heat, a great deal of heat can be generated as Reactants A and B are thoroughly mixed. Second heat exchanger 146 is thus able to cool Reactants A and B while in mixing chambers 177, so that the temperatures of the reactants do not exceed the ideal temperature for the desired reaction. Second heat exchanger 146 occupies both the fourth and fifth layers (simple plates 140 and 150), to increase the capacity of the heat exchanger.

FIG. 18C illustrates the fluid path for heat transfer media A as it passes through the first thirteen layers of preferred reactor 100. Heat transfer media A enters the reactor at top simple plate 110 via intake port 112*a*. The heat transfer media A then passes through identical heat transfer media A intake manifolds 122*a* on simple plates 120 and 130 of layers 2 and 3 respectively. Heat transfer media A continues to pass through heat transfer media A intake manifolds in layers 4, 5, 6 and 7, via intake manifolds 142*a*. It should be noted that intake manifolds 142*a* differ in size and shape relative to the intake manifolds 122*a* of layers 2 and 3. The functional purpose of the size change is both reduce potential pressure drops within the fluid paths of the reactor, as well as to reduce the surface area of simple plates 140–170 to enhance bonding.

In layer 8, the shape of heat transfer media A intake manifold 182*a* changes once again. The purpose of the size change between the heat transfer media A intake manifolds in layers 7 and 8 is so that heat transfer media A can be fed into two separate sections of the layer 9. In a first heat transfer media A fluid path in layer 9, heat transfer media A flows into a heat transfer media A intake manifold 142*a*, and from there to heat transfer media A intake manifold 42*a* of tenth simple plate 200 in layer 10. From there, heat transfer media A flows to heat transfer media A intake manifold 142*a* in layer 11, an enlarged heat transfer media A intake manifold in layer 12, and then to heat transfer media A intake manifold 142*a* in layer 13.

In a second heat transfer media A fluid path in layer 9, fluid flows out of heat transfer media A intake manifold 182*a* of eighth simple plate 180 and into third heat exchanger 193 on ninth simple plate 190 of layer 9. The purpose of third heat exchanger 193 is to moderate the temperature of the solid portion of layer 10 immediately adjacent to reaction channels 116 in layer 11. Heat transfer media A exits heat exchanger 193 by returning to layer 8 via heat transfer media A exhaust manifold 182*a*, which is enlarged and overlaps the right end of third heat exchanger 193.

Simple plate 200 of layer 10 includes enlarged heat transfer media A intake manifold 182*a* (as well as exhaust manifold 182*b*). It should be noted that reaction channels 116 of layer 11 are not quite long enough to overlap the enlarged heat transfer medial intake and exhaust manifolds 182*a* and 182*b*, thus no heat transfer media enters reaction channels 116. Here, the functional purpose of the size change of the intake and exhaust manifolds is to reduce the surface area of tenth simple plate 200, to enhance bonding, rather than to feed a heat exchanger (as in layer 8 and eighth simple plate 180).

Referring now to layer 11, note that again the size and shape of heat transfer media A intake manifold 142*a* has changed relative to the intake manifolds of layers 8 and 10. This size change relates to maintaining a calculated fluidic equilibrium throughout the micro reactor. However, it is contemplated that the overall effect of the size change is relatively minor, and that an effective micro reactor can be achieved without changing the size of the intake manifolds on layer 11.

In layer 12, the size and shape of heat transfer media A intake manifold 182*a* is again enlarged, to once again divert some heat transfer fluid A into a second fluid path that services fourth heat exchangers 133*a* and 133*b* of layer 13. Heat transfer media A also flows into a heat transfer media A intake manifold 42*a* in layer 13. The functional purpose of heat transfer media A intake manifold 142*a* of layer 13 is to ensure that the fluid pressure within fourth heat exchangers 133*a* and 133*b* matches the fluid pressure within third heat exchanger 193. Note both the third and fourth heat exchangers are moderating the temperature of reaction channels 116, and thus preferably both heat exchanges should have similar flow characteristics.

Heat transfer fluid A that has entered fourth heat exchangers 133*a* and 133*b* exits layer 13 via heat transfer media A exhaust manifold 142*b* in layer 12. From there, heat transfer media A moves successively through heat transfer media exhaust manifolds 142*b* in layer 11, 182*b* in layer 10, 142*b* in layer 9, 182*b* in layer 8, 142*b* in layers 7–4 and 122*b* in layers 3–2. Heat transfer media A finally exits the reactor via outlet 112*b* in top simple plate 110.

Generally the heat transfer media used in the preferred reactor will be liquids, although it is envisioned that selected gases may also be beneficially employed. Fluidized solid heat transfer media (such as sand or silica) are known in the art, and might be used, though the dimensions involved in the fluid channels of the preferred reactor raise the concern that the solid heat transfer media could cause clogging of the heat transfer pathways.

Although the present invention has been described in connection with the preferred form of practicing it and various modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

What is claimed is:

1. A modular system for producing a chemical product from a plurality of reactants comprising:
   (a) a control module, said control module being adapted to monitor and control production of the chemical product by the modular system, said control module comprising a processor, a reaction database, and a user interface, the control module being configured to enable a user to interact with the user interface to select a specific reaction to produce the chemical product, from a plurality of different reactions stored in the reaction database, so that in response to a selection made by a user, the processor automatically controls the modular system to produce the chemical product according to reaction parameters for the specific reaction that was selected, said reaction parameters being stored in the reaction database;
   (b) a reactant supply source for each of said plurality of reactants, a flow of each reactant from its reactant supply source being controlled by the control module; and
   (c) a first reaction module in fluid communication with each reactant supply source to receive each of the plurality of reactants, said first reaction module being controllably connected to said control module and including a reactor, said reactor automatically producing the chemical product from said plurality of reactants under the control of the control module, said reactor comprising a plurality of simple plates stacked in layers, each simple plate having at least one opening that extends therethrough, an opening in each simple plate overlapping at least one other opening in an adjacent simple plate, thereby forming at least one passage within said reactor for each of said plurality of reactants, each at least one passage for each of said plurality of reactants merging within said reactor to form at least one reaction chamber, the chemical product being formed within said at least one reaction chamber by a reaction between said plurality of reactants, the plurality of simple plates including plates of different thicknesses, such that each simple plate disposed at an uppermost layer and at a lowermost layer in said reactor is substantially thicker than each simple plate disposed between the uppermost layer and the lowermost layer; and (d) a pump module controllably connected to the control module, said pump module being in fluid communication with each reactant supply source and with said first reaction module, the pump module pumping a plurality of fluids through the modular system, the pump module comprising a housing enclosing:

(i) a first reactant pump;
(ii) a second reactant pump;
(iii) a heat transfer media pump;
(iv) a data and power bus;
(v) a first valve configured to selectively couple the first reactant pump in fluid communication with a solvent supply and a first reactant supply; and
(vi) a second valve configured to selectively couple the second reactant pump in fluid communication with the solvent supply and a second reactant supply.

2. The modular system of claim 1, wherein said reactor is replaceable, and comprises at least one mixing volume.

3. The modular system of claim 1, wherein said reactor is specifically configured to enable it to produce a class of chemical products, and is selectively readily removable from said first reaction module and replaceable with a different reactor configured to facilitate the production of a different class of chemical products, thus enabling said modular system to selectively produce different classes of chemical products.

4. A modular system for producing a chemical product from a plurality of reactants comprising:

(a) a control module, said control module being adapted to monitor and control production of the chemical product by the modular system;
(b) a reactant supply source for each of said plurality of reactants, a flow of each reactant from its reactant supply source being controlled by the control module; and
(c) a first reaction module in fluid communication with each reactant supply source to receive each of the plurality of reactants, said first reaction module being controllably connected to said control module and comprising:
  (i) a housing;
  (ii) a mounting frame disposed within the housing, the mounting frame being configured to support a reactor, the mounting frame comprising a plurality of plates, at least one of which is fixed in position, and at least one of which is moveable, the at least one movable of the plurality of plates enabling the reactor to be removed from the mounting frame; and
  (iii) a replaceable reactor supported by the mounting frame, said replaceable reactor automatically producing the chemical product from said plurality of reactants under the control of the control module, said replaceable reactor comprising a plurality of simple plates, the simple plates being configured such that aligned openings in the plurality of simple plates achieve at least two reactant fluid pathways, at least one mixing volume, at least one reaction volume, and at least one product fluid pathway.

5. The modular system of claim 4, wherein at least one reactant supply source and said first reaction module are configured to accommodate a reactant that is in a gaseous state.

6. The modular system of claim 4, further comprising a pump module controllably connected to the control module, said pump module being in fluid communication with each reactant supply source and with said first reaction module, the pump module pumping a plurality of fluids through the modular system, the pump module comprising a housing enclosing:

(a) a first reactant pump;
(b) a second reactant pump;
(c) a heat transfer media pump;
(d) a data and power bus;
(e) a first valve configured to selectively couple the first reactant pump in fluid communication with a solvent supply and a first reactant supply; and
(f) a second valve configured to selectively couple the second reactant pump in fluid communication with the solvent supply and a second reactant supply.

7. The modular system of claim 4, further comprising an additional processing module in fluid communication with said first reaction module, said additional processing module being disposed downstream of said reactor, such that the chemical product produced in the reactor passes through said additional processing module.

8. The modular system of claim 7, wherein said additional processing module comprises a residence time module in which reaction of the chemical product continues toward completion for a predetermined amount of time.

9. The modular system of claim 8, wherein said residence time module comprises a capillary passage of a length selected to obtain the predetermined amount of time for said chemical product in said residence time module.

10. The modular system of claim 8, wherein said residence time module comprises a proportional valve, said proportional valve being controllably connected to said control module to selectively vary a pressure within said modular system.

11. The modular system of claim 7, wherein said additional processing module comprises a second reaction module in fluid communication with said first reaction module, such that a serial fluid path is created with respect to said first reaction module, said second reaction module being controllably connected to said control module and including a reactor that produces the chemical product from a reaction of said plurality of reactants using a plurality of synthesis steps, a first synthesis step being completed in said first reaction module, and a second synthesis step being completed in said second reaction module.

12. The modular system of claim 11, further comprising sufficient additional processing modules, each additional processing module including a reaction module, so that production of the chemical product can be achieved using additional synthesis steps that are completed in succession, each additional synthesis step being completed in a different one of the additional processing modules, the reaction module in each additional processing module being configured to receive a product from a previous additional processing module in which an immediately preceding synthesis step was completed.

13. The modular system of claim 7, wherein said housing of the first reaction module comprises:
   (a) a first side that includes a plurality of ports enabling said first reaction module to be removably connected to said control module and in fluid communication with said each reactant supply; and
   (b) a second side that includes a plurality of ports enabling said first reaction module to be in fluid communication with at least one of the additional processing module and a product reservoir.

14. The modular system of claim 4, wherein said first reaction module comprises means for facilitating production of said chemical product.

15. The modular system of claim 14, wherein said means include at least one of a heat exchanger, a temperature sensor, and a reactant laminar flow mixing passage.

16. The modular system of claim 4, wherein said modular system further comprises at least one fluid path for a heat transfer media, and at least one fluid path for a spent heat transfer media.

17. The modular system of claim 16, wherein said at least one fluid path for said heat transfer media and said at least one fluid path for said spent heat transfer media are configured in a serial fluidic system.

18. The modular system of claim 6, wherein each pump in the pump module is controllably connected to said control module to control operation of the pump.

19. The modular system of claim 6, wherein said each valve in the pump module is controllably connected to said control module to control a flow of one of said plurality of reactants to said first reaction module.

20. The modular system of claim 6, wherein said pump module comprises at least one filter that filters one of said plurality of reactants before the reactant flows to said first reaction module.

21. The modular system of claim 6, wherein said housing comprises:
   (a) a first side that includes a plurality of ports enabling said pump module to be controllably connected to said control module, and to be in fluid communication with each reactant supply source; and
   (b) a second side that includes a plurality of ports enabling said pump module to be in fluid communication with said first reaction module.

22. The modular system of claim 6, wherein all connections between modules are achieved using quick connect connectors that enable rapid connection and disconnection of the modules.

23. A modular system for producing a chemical product from a plurality of reactants comprising:
   (a) a control module, said control module being adapted to monitor and control production of the chemical product by the modular system, said control module comprising a processor, a reaction database, and a user interface, the control module being configured to enable a user to interact with the user interface to select a specific reaction to produce the chemical product, from a plurality of different reactions stored in the reaction database, so that in response to a selection made by a user, the processor automatically controls the modular system to produce the chemical product according to reaction parameters for the specific reaction that was selected, said reaction parameters being stored in the reaction database;
   (b) a reactant supply source for each of said plurality of reactants, a flow of each reactant from its reactant supply source being controlled by the control module; and
   (c) a first reaction module in fluid communication with each reactant supply source to receive each of the plurality of reactants, said first reaction module being controllably connected to said control module and including a reactor, said reactor automatically producing the chemical product from said plurality of reactants under the control of the control module, said reactor comprising a plurality of simple plates stacked in layers, each simple plate having at least one opening that extends therethrough, an opening in each simple plate overlapping at least one other opening in an adjacent simple plate, thereby forming at least one passage within said reactor for each of said plurality of reactants, each at least one passage for each of said plurality of reactants merging within said reactor to form at least one reaction chamber, the chemical product being formed within said at least one reaction chamber by a reaction between said plurality of reactants, the plurality of simple plates including plates of different thicknesses, such that each simple plate disposed at an uppermost layer and at a lowermost layer in said reactor is substantially thicker than each simple plate disposed between the uppermost layer and the lowermost layer; and
   (d) an additional processing module in fluid communication with said first reaction module, said additional processing module being disposed downstream of said reactor, such that the chemical product produced in the reactor passes through said additional processing module, said additional processing module comprising a residence time module in which reaction of the chemical product continues toward completion for a predetermined amount of time, said residence time module comprising a proportional valve, said proportional valve being controllably connected to said control module to selectively vary a pressure within said modular system.

24. A modular system for producing a chemical product from a plurality of reactants comprising:
   (a) a control module, said control module being adapted to monitor and control production of the chemical product by the modular system, said control module comprising a processor, a reaction database, and a user interface, the control module being configured to enable a user to interact with the user interface to select a specific reaction to produce the chemical product, from a plurality of different reactions stored in the reaction database, so that in response to a selection made by a user, the processor automatically controls the modular system to produce the chemical product according to reaction parameters for the specific reaction that was selected, said reaction parameters being stored in the reaction database;
   (b) a reactant supply source for each of said plurality of reactants, a flow of each reactant from its reactant supply source being controlled by the control module; and
   (c) a first reaction module in fluid communication with each reactant supply source to receive each of the plurality of reactants, said first reaction module being controllably connected to said control module and including a reactor, said reactor automatically producing the chemical product from said plurality of reactants under the control of the control module, said reactor comprising a plurality of simple plates stacked in layers, each simple plate having at least one opening that extends therethrough, an opening in each simple plate overlapping at least one other opening in an adjacent simple plate, thereby forming at least one passage within said reactor for each of said plurality of reactants, each at least one passage for each of said plurality of reactants merging within said reactor to form at least one reaction chamber, the chemical product being formed within said at least one reaction chamber by a reaction between said plurality of reactants, the plurality of simple plates including plates of different thicknesses, such that each simple plate disposed at an uppermost layer and at a lowermost layer in said reactor is substantially thicker than each simple plate disposed between the uppermost layer and the lowermost layer; said first reaction module further including a housing, said housing comprising:

(i) a first side that includes a plurality of ports enabling said first reaction module to be removably connected to said control module and in fluid communication with said each reactant supply;

(ii) a second side that includes a plurality of ports enabling said first reaction module to be in fluid communication with at least one of an additional processing module and a product reservoir; and (iii) a mounting frame for said reactor, said mounting frame being enclosed within said housing, and being configured to apply a biasing force to secure said reactor in position; and (d) an additional processing module in fluid communication with said first reaction module, said additional processing module being disposed downstream of said reactor, such that the chemical product produced in the reactor passes through said additional processing module.

25. A modular system for producing a chemical product from a plurality of reactants comprising:

(a) a control module, said control module being adapted to monitor and control production of the chemical product by the modular system;

(b) a reactant supply source for each of said plurality of reactants, a flow of each reactant from its reactant supply source being controlled by the control module; and (c) a first reaction module in fluid communication with each reactant supply source to receive each of the plurality of reactants, said first reaction module being controllably connected to said control module and comprising:

(i) a housing;

(ii) a replaceable reactor, said replaceable reactor automatically producing the chemical product from said plurality of reactants under the control of the control module; and (iii) a mounting frame disposed within the housing, the mounting frame being configured to support the replaceable reactor, the mounting frame comprising a plurality of plates, at least one of which is fixed in position, and at least one of which is moveable, the at least one of the plurality of plates that is movable enabling the replaceable reactor to be removed from the mounting frame.

* * * * *